United States Patent [19]

Thomas

[11] Patent Number: 5,385,706
[45] Date of Patent: Jan. 31, 1995

[54] PROCESS OF MAKING A REFASTENABLE MECHANICAL FASTENING SYSTEM WITH SUBSTRATE HAVING PROTRUSIONS

[75] Inventor: Dennis A. Thomas, Cincinnati, Ohio

[73] Assignee: The Proctor & Gamble Company, Cincinnati, Ohio

[21] Appl. No.: 44,337

[22] Filed: Apr. 7, 1993

[51] Int. Cl.⁶ .................... B29C 41/32; B29C 61/02; B32B 3/16

[52] U.S. Cl. .................... 264/519; 264/145; 264/163; 264/164; 264/167; 264/171; 264/237; 264/284; 264/291; 264/296; 264/327

[58] Field of Search ............. 264/138, 145, 161, 163, 264/164, 167, 171, 237, 251, 284, 291, 296, 327, 519

[56] References Cited

U.S. PATENT DOCUMENTS

| | | | |
|---|---|---|---|
| 2,717,437 | 9/1955 | de Mestral | 428/92 |
| 3,089,191 | 5/1963 | Conrad . | |
| 3,147,528 | 9/1964 | Erb | 24/452 |
| 3,266,113 | 8/1966 | Flanagan, Jr. | 24/452 |
| 3,461,513 | 8/1969 | Girard et al. | 24/445 |
| 3,536,518 | 10/1970 | Drelich | 427/283 |
| 3,550,223 | 12/1970 | Erb | 24/448 |
| 3,550,837 | 12/1970 | Erb | 229/125.37 |
| 3,562,044 | 2/1972 | Erb | 156/155 |
| 3,594,863 | 7/1971 | Erb | 425/505 |
| 3,594,865 | 7/1971 | Erb | 425/129.1 |
| 3,629,032 | 12/1971 | Erb | 156/196 |
| 3,943,981 | 3/1976 | DeBrabander | 139/391 |
| 3,950,480 | 4/1976 | Adams et al. | 264/284 |
| 4,056,593 | 11/1977 | de Navas Albareda | 264/145 |
| 4,216,257 | 8/1980 | Schams et al. | 428/93 |
| 4,454,183 | 6/1984 | Wollman | 428/92 |
| 4,532,157 | 7/1985 | Schmidt et al. | 427/262 |
| 4,562,099 | 12/1985 | Hinchcliffe | 427/282 |
| 4,587,152 | 5/1986 | Gleichenhagen et al. | 428/195 |
| 4,672,893 | 6/1987 | Mammarella, Sr. | 101/170 |
| 4,894,060 | 1/1990 | Nestegard | 604/391 |
| 4,938,835 | 7/1990 | Ludwig | 118/68 |
| 5,116,563 | 5/1992 | Thomas et al. | 264/167 |
| 5,180,534 | 1/1993 | Thomas et al. | 264/145 |
| 5,230,851 | 7/1993 | Thomas | 264/145 |

FOREIGN PATENT DOCUMENTS

| | | |
|---|---|---|
| 294507 | 12/1988 | European Pat. Off. . |
| 325473 | 7/1989 | European Pat. Off. . |
| WO9300215 | 7/1993 | WIPO . |

*Primary Examiner*—Leo B. Tentoni
*Attorney, Agent, or Firm*—Steven W. Miller; E. Kelly Linman; Jacobus C. Rasser

[57] ABSTRACT

The invention is a refastenable mechanical fastening system, made of flee-formed prongs joined to an embossed or raised substrate. The prongs taper and are nonperpendicularly oriented relative to the plane of the substrate. Each prong has an engaging means projecting laterally from the periphery of the prong. The free formed prongs are manufactured by the process of depositing liquid material onto the embossed or raised portion of a moving substrate, stretching the liquid material in a direction parallel to the plane of the embossed or raised substrate and severing the stretched material to form the distal end and engaging means of the prong. The advantageous usage of the fastening system in an article of manufacture, such as a disposable absorbent garment, specifically a diaper, is also disclosed.

19 Claims, 8 Drawing Sheets

PROCESS OF MAKING A REFASTENABLE MECHANICAL FASTENING SYSTEM WITH SUBSTRATE HAVING PROTRUSIONS

FIELD OF THE INVENTION

The present invention relates to refastenable mechanical fastening systems, more particularly to fastening systems having free formed prongs attached to the protruding portion of a substrate and the press of manufacturing such fastening systems.

BACKGROUND OF THE INVENTION

Refastenable mechanical fastening systems are well known in art. Typically, such fastening systems involve two major components, a prong that is joined to a substrate that engages with a complement second component, the receiving surface. A projection of the prong of the fastening system penetrates the receiving surface and either engages or intercepts strands or fibers of the receiving surface. The resulting mechanical interference and physical obstruction prevent removal of the fastening system from the receiving surface until the separation forces exceed either the peel or shear strength of the fastening system.

Refastenable mechanical fastening systems have been disclosed by a number of references. Examples include: U.S. Pat. No. 2,717,437, issued Sept. 13, 1955 to de Mestral; U.S. Pat. 3,009,5 issued Nov. 11, 1961 to de Mestral; U.S. Pat. No. 3,147,528, issued Sept. 8, 1964 to Erb; U.S. Pat. No. 3,594,863, issued Jul. 27, 1971 to Erb; U.S. Pat. No. 3,708,833, issued Jan. 9, 1973 to Ribich et al.; U.S. Pat. No. 3,943,981, issued Mar. 16, 1976 to De Brabandar; U.S. Pat. No. 4,216,257, issued Aug. 5, 1980 to Schams et al.; U.S. Pat. No. 4,307,493, issued Dec. 29, 1981 to Ochiai; U.S. Pat. No. 4,330,907, issued May 25, 1982 to Ochiai; U.S. Pat. No. 4,454,183, issued Jun. 12, 1984 to Wollman; U.S. Pat. No. 4,463,486, issued Aug. 7, 1984 to Matsuda; U.S. Pat. No. 4,984,339, issued Jan. 15, 1991 to Provost et al.; U.S. Pat. No. 5,058,247 issued Oct. 22, 1991 to Thomas et al.; and U.S. Pat. No. 5,116,563 issued May 26, 1992 to Thomas et al. An additional reference of interest includes: European Pat. No. 276,970, filed Jan. 26, 1988, by the Procter & Gamble Company in the name of Scripps.

It is an object of the present invention to provide a free formed mechanical fastening system attached to a protrusion on the substrate surface, the prong is produced by a method of manufacture similar to gravure printing. However, instead of utilizing an engraved print roll, a substrate having protrusions is used. It is also an object of this invention to provide a fastening system attached to protrusions on the substrate which have tapered prongs that do not perpendicularly project from the associated substrate.

BRIEF SUMMARY OF THE INVENTION

The invention comprises a fastening system which is affixed to protrusions on a substrate which attach to a complementary receiving surface. The fastening system has at least one protrusion on the substrate surface and at least one free formed prong, attached to the protrusion, comprising a base, shank and engaging means. The base of the prong is joined to the prong attachment surface of the protrusion of the substrate. The shank is contiguous with and projects outwardly from the base. The engaging means is joined to the shank and projects laterally beyond the periphery of the shank. The shank is nonperpendicularly oriented relative to the plane of the substrate. The shank has a leading edge and a trailing edge defining a leading angle and trailing angle respectively. The leading angle and trailing angle are substantially different from each other, so that the sides of the shank are nonparallel.

The fastening system may be made according to the process comprising the steps of heating a thermally sensitive material sufficiently to reduce its viscosity for processing, and preferably to at least its melting point. A means to deposit discrete amounts of the heated material is provided. The substrate having protrusions to which the material is to be joined is transported in a first direction relative to the means for depositing the material. The material is deposited upon the protruding portions of the transported substrate in discrete amounts. The discrete amounts of material are then stretched in a direction having a component generally parallel to the plane of the substrate and the stretched material is severed to form a distal end and engaging means.

An illustrative and suitable, but nonlimiting, use for the fastening system produced by the process of the present invention is in conjunction with a disposable absorbent garment, such as a diaper. This example of one usage of the present invention is more fully described below.

BRIEF DESCRIPTION OF THE DRAWINGS

While the Specification concludes with claims particularly pointing out and distinctly claiming the invention, it is believed the invention will be better understood from the following description taken in conjunction with the associated drawings in which like elements are described by the same reference numeral and related elements are designated by adding one or more prime symbols or incrementing the numeral by 100:

DETAILED DESCRIPTION OF THE INVENTION

Figure 1:
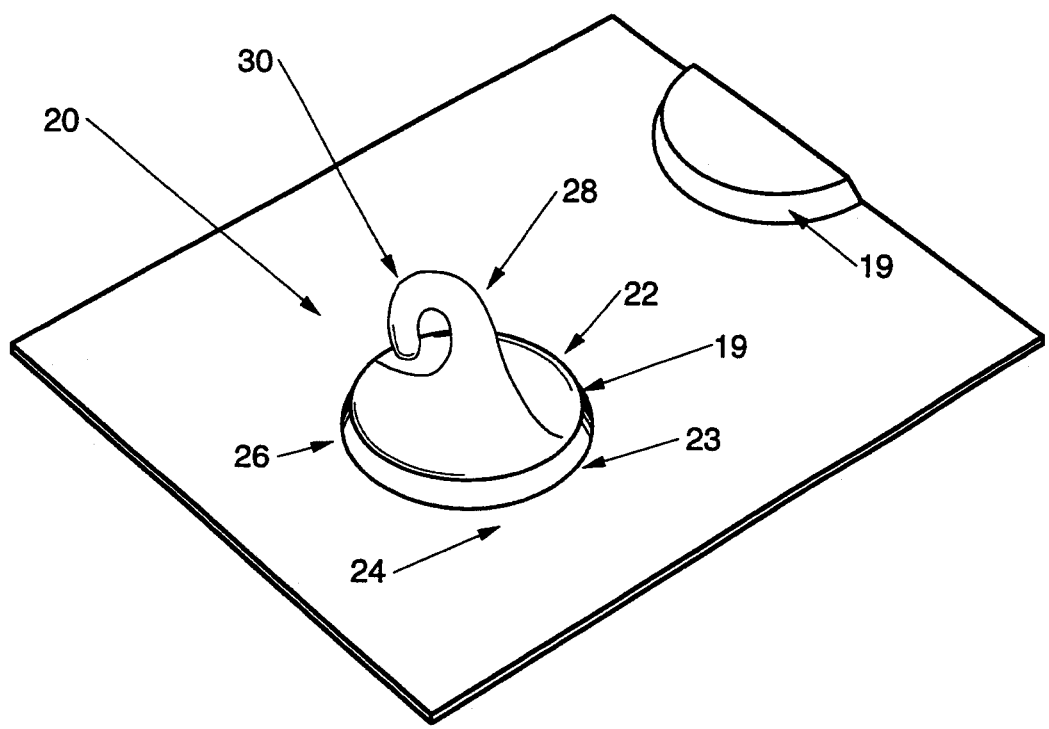
FIG. 1 is a perspective view of a single prong of the fastening system of the present invention placed upon a substrate protrusion. The substrate protrusion is an emboss.

By "protrusion", "protruding" or "protuberance" as used herein, means a portion of the substrate or an element affixed to the substrate surface which is higher in relief from the plane of the surface of the substrate, and has a surface to which a prong can be joined.

By "prong attachment surface" as used herein, means that portion of a protrusion or protuberance to which a prong will be joined.

The fastening system 20 of the present invention comprises at least one prong 22, and preferably an array of prongs 22, joined to the protruding portion 23 of a substrate 24 in a predetermined pattern. The prongs 22 have a base 26, shank 28 and engaging means 30. The bases 26 of the prongs 22 contact and adhere to the prong attachment surface 25, of the substrate protrusions 23, and support the proximal ends of the shanks 28. The shanks 28 project outwardly from the substrate protrusions 23. The shanks 28 terminate at a distal end which is joined to an engaging means 30. The engaging means 30 radially project laterally from the shanks 28 in one or more directions and may resemble a hook-shaped tine. As used herein, the term "lateral" means having a vector component generally parallel to the plane of the prong attachment surface 25 at the principal prong 22 under consideration. The projection of an engaging means 30 from the shank 28 periphery in a lateral direction allows the engaging means 30 to be, secured to a complementary receiving surface (not shown). The engaging means 30 is joined to, and preferably contiguous with, the distal end of the prong 22. It will be apparent the engaging means 30 may be joined to the prong 22 at a position between the base 26 and the distal end of the shank 28.

An array of prongs 22 may be produced by any suitable method, including methods which yield a free formed prong 22 as described and claimed hereinbelow. As used herein, the term "free formed" means a structure which is not removed from a mold cavity or extrusion die in solid form or with a defined shape. The prongs 22 are deposited onto the prong attachment surface 25 of the substrate protrusions 23 of a noncontiguous substrate 24 in a molten, preferably liquid state and solidify, by cooling until rigid and preferably freezing, into the desired structure and shape as described hereinafter.

Figure 5:
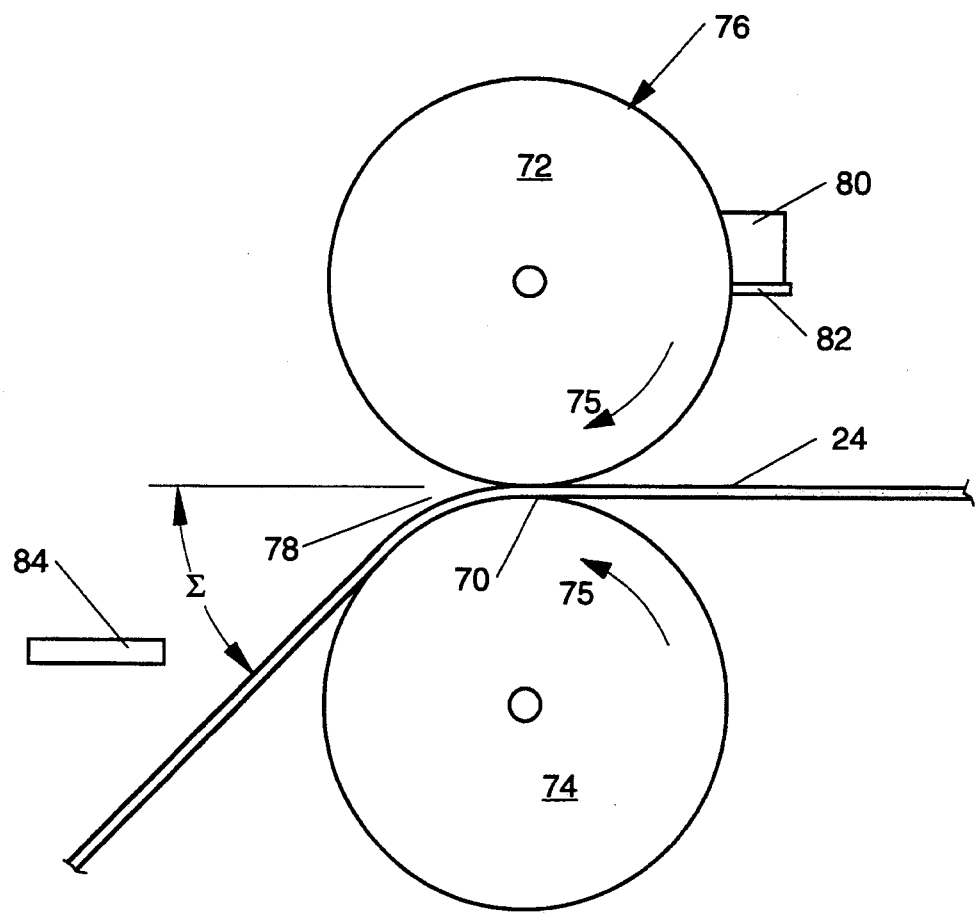
FIG. 5 is a schematic side elevational view of one apparatus which can be used to produce the fastening system of the present invention.

A free formed array of prongs 22 is preferably produced by a manufacturing process which is similar to that process commonly known as gravure printing. Using this process, a substrate 24 having protrusions 23 is passed between the nip 70 of two generally cylindrical rolls, a print roll 72 and a backing roll 74, as illustrated at FIG. 5. The rolls 72 and 74 have generally parallel centerlines and are maintained such that at least roll 72 is in a contacting relationship with the prong attachment surface 25 of the protruding portions 23 of the substrate 24 as it passe through the nip 70. One of the rolls, referred to as the print roll 72, is smooth and is covered with a thin layer of thermally sensitive material. As the protruding portions 23 of the substrate 24 passes through the nip 70 between the print roll 72 and the second roll, referred to as the backing roll 74, thermally sensitive material is deposited upon the prong attachment surface 25 of the substrate protrusions 23. The pattern of substrate protrusions 23 correspond to the pattern of the prong array 22 which will be produced. During this process the nip 70 should be fixed and open, having a gap sufficient to allow the pattern of substrate protrusions 23 to contact and append adhesive material from the smooth print roll 72. Liquid, thermally sensitive material, preferably thermoplastic material, from which the prongs 22 are to be formed is supplied from a heated source, such as a trough 80. The thermally sensitive material is introduced onto the smooth print roll 72 as it is rotated about its centerline. The smooth print roll 72 with the thermally sensitive material spread upon its surface contacts only the substrate protrusions 23, and preferably only the prong attachment surfaces 25. Therefore, preferably, deposit of the thermally sensitive material is made exclusively on the prong attachment surfaces 25 of the substrate protrusions 23.

As relative displacement between prong attachments surfaces 25 of the protrusions 23 on the substrate 24 and rolls 72 and 74 continues, the prongs 22 are stretched with a lateral component, generally parallel to the plane of the prong attachment surface 25, forming the shank 28 and the engaging means 30. Finally, the moil of the prong 22 is severed from the engaging means 30 by a severing means 78. Due to the viscoelastic properties of the thermoplastic, the prong 22 retracts under the influences of gravity and shrinkage which occurs during cooling. The prong 22 then cools, and preferably freezes, into a solid structure having the engaging means 30 contiguous with the shank 28.

The fastening system 20 is secured to a complementary receiving surface. As used herein, the term "receiving surface" to which the engaging means 30 of the fastening system 20 are secured refers to any plane or surface having an exposed face with tightly spaced openings complementary to the engaging means 30 and defined by one or more strands or fibers or, alternatively, which exposed face is capable of localized elastic deformation so that the engaging means 30 may become entrapped and not withdrawn without interference. The openings or localized elastic deformations allow for entry of the engaging means 30 into the plane of the receiving surface, while the strands (or nondeformed material) of the receiving surface interposed between the openings (or deformed areas) prevent withdrawal or release of the fastening system 20 until desired by the user or either the peel or shear strength of the fastening system 20 is otherwise exceeded. The plane of the receiving surface may be flat or curved.

A receiving surface having strands or fibers, is said to be "complementary" if the openings between strands or fibers are sized to allow at least one engaging means 30 to penetrate into the plane of the receiving surface, and the strands are sized to be engaged or intercepted by the engaging means 30. A receiving surface which is locally deformable is said to be N "complementary" if at least one engaging means 30 is able to cause a localized disturbance to the plane of the receiving surface, which disturbance resists removal or separation of the fastening system 20 from the receiving surface.

Suitable receiving surfaces include reticulated foams, knitted fabrics, nonwoven materials, and stitchbonded loop materials, such as VELCRO brand loop materials sold by Velcro USA of Manchester, N.H. A particularly suitable receiving surface is stitchbonded fabric Number 970026 sold by the Milliken Company of Spartanburg, S.C.

Referring back to FIGS. 2 and 3 to examine the components of the fastening system 20 in more detail, the substrate 24 of the fastening system 20 should be strong enough to preclude tearing and separation of individual prongs 22. The substrate 24 should be a surface that is capable of having additional material attached forming protrusions 23 consisting of raised areas 21 as in FIG. 3. The raised areas 21 contain two separate attachment surfaces; a prong attachment surface 25 to which is joined the base of a free formed prong 22 forming a base-prong attachment surface interface, and a substrate attachment surface 27 forming a protrusion-substrate interface. The substrate attachment surface 27 is sufficiently joined to the substrate 24 to avoid separating from the substrate upon removal of the engaging means 30 from the complementary receiving surface.

Figure 2:
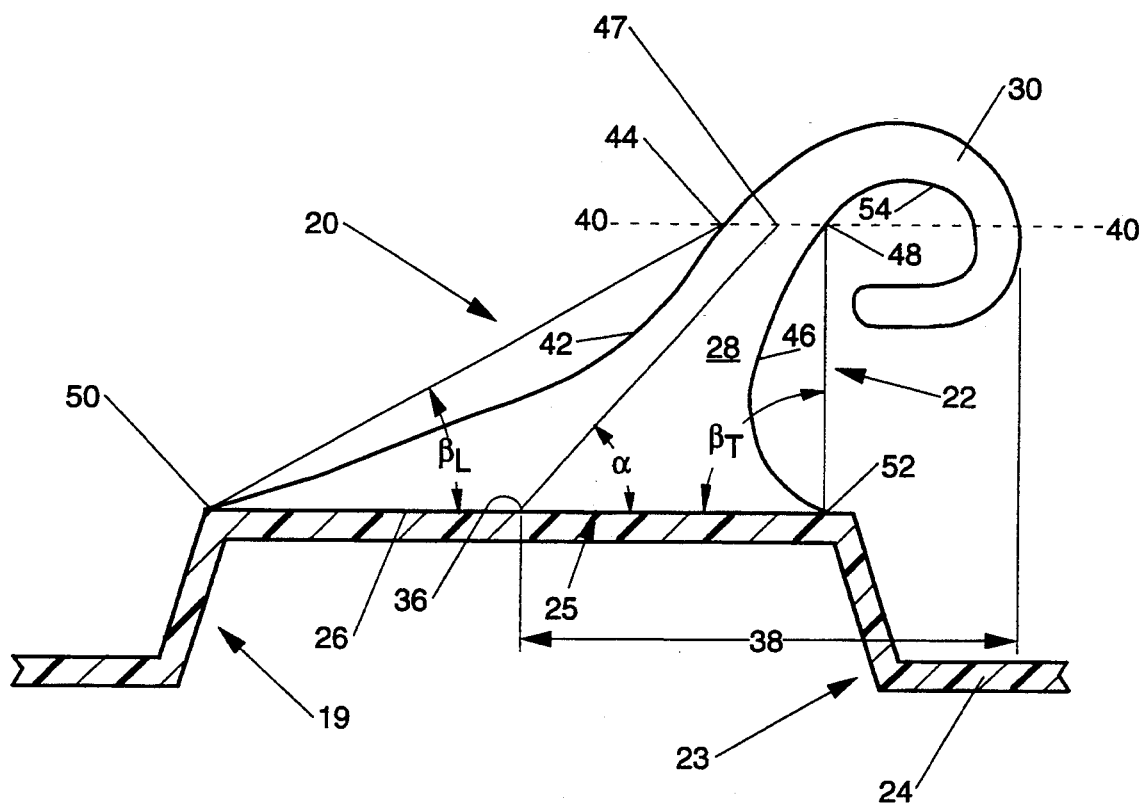
FIG. 2 is a schematic side elevational view of a single prong of the fastening system shown in FIG. 1.
Figure 3:
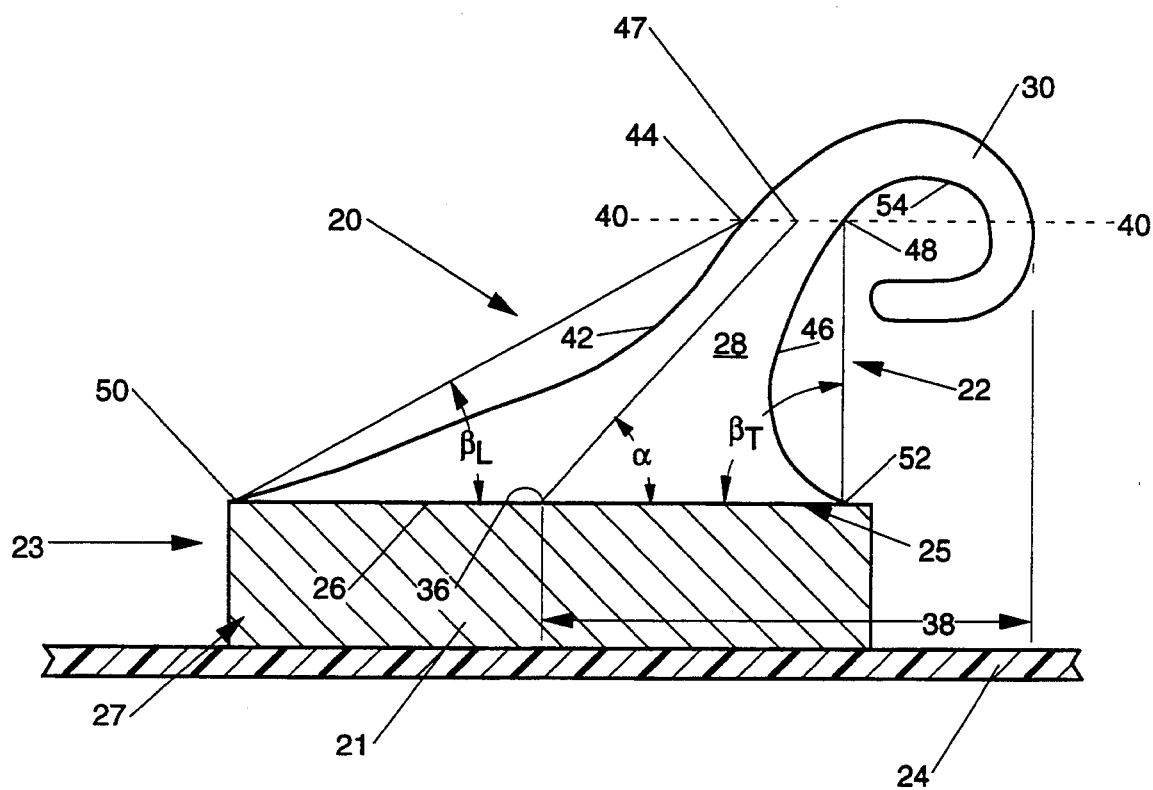
FIG. 3 is a schematic side elevational view similar to FIG. 2, however, the substrate protrusion is a raised area. The raised area comprises two attachment surfaces; a prong attachment surface and a substrate attachment surface.

Alternately, the substrate 24 should be sufficiently flexible and capable of being stretched to form protrusions 23 which are embosses 19 as in FIG. 2 The embosses 19, formed from the substrate 24 material contain a prong attachment surface 25 to which is joined the base of a free formed prong 22 creating a base-prong attachment surface interface. The prongs 22 will readily adhere and be capable of being joined to an article to be secured as desired by a user. As used herein the term "join" refers to the condition where a first member, or component, is affixed, or connected to a second member or component, either directly; or indirectly, where the first member or component is affixed or connected to an intermediate member, or component which in turn is affixed, or connected, to the second member or component. The association between the first member, or component, and the second member, or component, is intended to remain for the life of the article. The "substrate" is any exposed surface having one or more protuberances 23 consisting of embossed 19 or raised areas 21 as illustrated in FIGS. 2 and 3, having a prong attachment surface 25 to which one or more prongs 22 are joined.

The substrate 24 should also be capable of being rolled, to support conventional manufacturing processes, flexible so that the substrate 24 may be bent or flexed in a desired configuration, and able to withstand the heat of the liquid prongs 22 being deposited upon the prong attachment surface 25 of the substrate protuberances 23 without melting or incurring deleterious effects until such prongs 22 freeze. The substrate 24 should also be available in a variety of widths. Suitable substrates 24 capable of supporting protuberances 23, include knitted fabric, woven materials, nonwoven materials, rubber, vinyl, films, particularly kraft paper and preferably polyolefinic films. White kraft paper having a basis weight of 0.08 kilograms per square meter (50 pounds per 3,000 square feet) has been found suitable.

The base 26 is the generally planar portion of the prong 22 which is attached to the prong attachment surface 25 of the substrate protuberances 23 of the substrate 24 and is contiguous with the proximal end of the shank 28 of the prong. As used herein, the term "base" refers to that portion of the prong 22 which is in direct contact with the prong attachment surface 25 of the substrate 24 and supports the shank 28 of the prong 22. It is not necessary that a demarcation be apparent between the base 26 and the shank 28. It is only important that the shank 28 not separate from the base 26 and that the base 26 not separate from the prong attachment surface 25 during use. The base 26 cross section should provide sufficient structural integrity, and hence area, for the desired peel and shear strengths of the fastening system 20, based on the density of the pattern of prongs 22 and length of the shanks 28 of the individual prongs 22 and further provide adequate adhesion to the prong attachment surface 25. If a longer shank 28 is utilized, the base 26 should generally be of greater cross sectional area providing sufficient adhesion to the prong attachment surface 25 and adequate structural integrity.

The shape of the footprint of the base 26 on the prong attachment surface 25 will generally correspond to the area of the prong attachment surface 25. The footprint may be enlarged by increasing the area of the prong attachment surface 25 of the substrate protrusions 23, this will provide greater structural integrity and thus a greater peel strength in that direction. As used herein, the term "footprint" refers to the planar contact area of the base 26 on the prong attachment surface 25 of the protruding areas 23 of the substrate 24. The aspect ratio of the sides of the footprint should not be too great, otherwise the prong 22 may be unstable when subjected to forces parallel to the shorter side of the footprint. An aspect ratio of less than about 1.5:1 is preferred and a generally circular prong attachment surface 25 corresponding to a circular footprint is more preferred. However, altering the shape of the footprint can result in the formation of a free formed prong having an azimuthal angle. Such prongs are described in greater detail in Procter & Gamble applications 4417, Ser. No. 07/719211, filed in the name of Thomas et al. on Jun. 21, 1991, now abandoned and U.S. Pat. No. 5,180,534, issued Jan. 19, 1993, to Thomas et al. both herein incorporated by reference.

For the embodiment described herein, a base 26 having a footprint of generally circular shape placed upon a generally circular prong attachment surface 25 of a substrate protrusion 23 being approximately 0.76 millimeters to 1.27 millimeters (0.030 to 0.050 inches) in diameter is suitable. If it is desired to make the fastening system 20 have a greater peel or shear strength in a particular direction, the cross sectional area of the prong attachment surface 25 and substrate protrusion 23 and correspondingly the base 26 may be modified to amplify such direction, so that the strength and structural integrity relative to the axis orthogonal to such direction increases. This modification causes the prongs 22 to be stronger when pulled in the amplified direction of the base 26.

The shank 28 is contiguous with the base 26 and projects outwardly from the base 26 and the prong attachment surface 25 of the substrate protrusion 23. As used herein, the term "shank" refers to that portion of the prong 22 which is intermediate of and contiguous with the base 26 and the engaging means 30. The shank 28 provides longitudinal spacing of the engaging means 30 from the prong attachment surface 25 of the substrate protrusions 23. As used herein, the term "longitudinal" means in a direction having a vector component away from the prong attachment surface 25, which direction increases the perpendicular distance to the plane of the prong attachment surface 25 at the base-prong attachment interface of the prong 22, unless otherwise specified to be a direction having a vector component towards such plane of the prong attachment surface 25.

Associated with the shank 28 and base 26 of each prong 22 is an origin 36. The "origin" of the shank 28 is the point which may be thought of as the center of the base 26 and therefore the center of the prong attachment surface 25, and is typically within the footprint of the base 26. The origin 36 is found by viewing the prong 22, from the side view. The "side view" is any direction radially towards the shank 28 and base 26 which is also parallel to the plane of the prong attachment surface 25 of the substrate 24. If the fastening system 20 is manufactured by the process described and claimed below, it is preferred, but not necessary, that the prong 22 be viewed in the machine and crossmachine directions, relative to the travel of the substrate 24 through the nip 70, when determining the origin 36.

The lateral distance between the remote edges of the base 26 footprint for the particular side view under consideration is found, and this distance is bisected, yielding the midpoint of the base 26 for such view. When bisecting the footprint of the base 26 for the particular side view under consideration, minor discontinuities (such as fillets or asperities incident to the attachment to substrate 24) are ignored. This point is the origin 36 of the shank 28.

The shank 28 makes an angle α with the plane of the prong attachment surface 25, substrate protrusion 23 and the substrate 24. As used herein, the term "plane of the prong attachment surface" refers to the flat, planar surface of the substrate protrusions at the base 26 of the principal prong 22 under consideration. The angle α is determined as follows. The prong 22 is viewed in profile. The "profile view" of the prong 22 is one of two particular side views and found as follows. The prong 22 is visually inspected from the side views such that the direction having the maximum lateral projection 38 becomes apparent. The "lateral projection" is the distance taken laterally and parallel to the plane of the prong attachment surface 25 from the center of the base 26 in such view, i.e. the origin 36 of the shank 28, to the projection of the furthest laterally remote point on the prong 22 visible in such view when such point is longitudinally and perpendicularly projected downward to the plane of the prong attachment surface 25.

It will be apparent to one skilled in the art that the maximum lateral projection 38 is that projection from the origin 36 to the outer periphery of the shank 28 or engaging means 30. The side view of the prong 22 which maximizes the lateral projection 38 is the profile view of such prong 22. It will also be apparent to one skilled in the art that if the fastening system 20 is produced by the process described and claimed below, the maximum lateral projection 38 is generally oriented in the machine direction and, hence, the profile view is generally oriented in the cross-machine direction. The side elevational view shown in FIG. 2 is one of the profile views of the prong 22 placed upon an emboss 19. It will be further apparent to one skilled in the art that there is another profile view, generally 180° opposite from the profile view shown (so that the maximum lateral projection 38 is oriented towards the left of the viewer). Either of the two profile views is generally equally well suited for the procedures and usages described hereinbelow.

The origin 36 of the shank 28 is found, as described above, with the prong 22 in the profile view. While still maintaining the prong 22 in the profile view, an imaginary cutting plane 40—40, generally parallel to the plane of the prong attachment surface 25 and the substrate 24, is then brought into tangency with the periphery of the prong 22 at the point or segment of the prong 22 having the greatest perpendicular distance from the plane of the prong attachment surface 25. This corresponds to the portion of the prong 22 having the highest elevation. The imaginary cutting plane 40—40 is then brought one-fourth of such greatest perpendicular distance closer to the prong attachment surface of highest elevation, so that the imaginary cutting plane 40—40 intercepts the prong 22 at a longitudinal elevation three-fourths of the perpendicular distance from the plane of the prong attachment surface 25.

The imaginary cutting plane 40—40 is then used to determine three points on the prong 22. The first point is that point where the cutting plane intercepts the leading edge 42 of the prong 22 and is referred to as the 75% leading point 44. The "leading edge" is the apex of the periphery of the shank 28 which longitudinally faces away from the plane of the prong attachment surface 25 and the substrate 24. The second point is disposed about 180° through the center of the prong 22 and is the point where the cutting plane 40—40 intercepts the trailing edge 46 of the prong 22 and is referred to as the 75% trailing point 48. The "trailing edge" is the apex of the periphery of the shank 28 which longitudinally faces towards the prong attachment surface 25 and the substrate 24 and is generally oppositely disposed from the leading edge 42. The straight line connecting these two points falls, of course, within the cutting plane 40—40 and is bisected to yield the midpoint 47 of the imaginary cutting plane 40—40. A straight line is then drawn connecting the midpoint 47 of the imaginary cutting plane 40—40 with the origin 36 of the shank 28 at the base 26. The included angle α this line defines, relative to the plane of the prong attachment surface 25, is the angle α of the shank 28.

Alternatively stated, the angle a which the shank 28 makes relative to the plane of the prong attachment surface 25 is the 90° complement of that angle furthest from the perpendicular defined by the line, found in any side view, connecting the cutting plane midpoint 47 and the origin 36. Hence, the smallest angle relative to the plane of the prong attachment surface 25 when this line is viewed in any direction radially towards the shank 28, and particularly the origin 36, which direction is generally parallel to the plane of the prong attachment surface 25 and orthogonal to the perpendicular is the angle α of the shank 28. It is to be recognized that when the prong 22 is viewed approximately in the machine direction, or approximately 180° therefrom, the apparent angle α of the shank 28 will be about 90°. However, as discussed above, the angle α to be measured is that which deviates furthest from the perpendicular and, therefore, is generally that angle α determined when the prong 22 is viewed in profile, typically from about the cross-machine direction.

The angle α of the shank 28 may be generally perpendicular to the plane of the prong attachment surface 25, or is preferably oriented in an acute angular relation relative thereto to provide increased peel strength in a particular direction, which direction is generally parallel to the maximum longitudinal projection 38. However, the angle α of the shank 28 should not deviate excessively from the perpendicular, otherwise a fastening system 20 of more directionally specific shear strength results. For the embodiment described herein, a shank 28 having an angle a between about 45° and about 80°, preferably about 65°, works well. If the angle of the shank 28 is less than about 80°, the shank 28 is considered to be nonperpendicularly oriented relative to the plane of the prong attachment surface 25 (without regard to lateral orientation).

The imaginary cutting plane 40—40 and profile view can also be utilized to determine the angles of the leading edge 42 and the trailing edge 46 relative to the plane of the prong attachment surface 25. To determine these angles, the 75% leading point 44 and 75% trailing point 48 are found as described above. The base 26 leading point 50 is found as follows. The line through the base 26 upon the prong attachment surface 25 as viewed in profile is brought to intersect the leading edge 42 of the shank 28. This intersection is the "base leading point" 50. As noted above, minor discontinuities in the shank 28 near the base 26, incident to attachment to the prong attachment surface 25, are not considered when determining the base leading point 50. The 75% leading edge 42 point 44 is connected by a straight line to the base leading edge 42 point 50. This straight line forms an included angle $\beta_L$ relative to the plane of the prong attachment surface 25 and opening in the direction of the origin 36 and center of the shank 28. The angle $\beta_L$ is referred to as the angle of the leading edge 42 or simply the leading edge angle.

The base trailing point 52 is generally disposed 180° from the base leading point 50, through the center of the base 26, and found as follows. The line through the footprint of the base 26, and correspondingly the prong attachment surface 25, as viewed in profile is brought to intersect the trailing edge 46 of the shank 28. This intersection is the "base trailing point." As noted above, minor discontinuities in the shank 28 near the base 26, incident to attachment to the prong attachment surface 25 is not considered when determining the base trailing point 52. As described above, the 75% trailing point 48 is connected with the base trailing point 52 by a straight line. This straight line forms an included angle $\beta_T$ relative to the plane of the prong attachment surface 25 and opening in the direction of the origin 36 and center of the shank 28. The included angle $\beta_T$ is referred to as the angle of the trailing edge 46 or simply the trailing edge angle.

The leading edge 42 and trailing edge 46 included angles $\beta_L$ and $\beta_T$ define the parallelism of the sides of the shank 28. If the angles $\beta_L$ and $\beta_T$ of the leading and trailing edges 42 and 46 are not supplementary to each other (do not add to an arithmetic sum of about 180°) the sides of the shank 28 are said to be nonparallel. If the sides of the shank 28 are nonparallel, the straight lines which define the angles $\beta_L$ and $\beta_T$ (connecting the base leading and trailing points 50 and 52 with the 75% leading and trailing points 44 and 48 respectively) intersect, either above or below the plane of the prong attachment surface 25. If the angles $\beta_L$ and $\beta_T$ of the leading and trailing edges 42 and 46 are unequal and the lines defining such angles intersect above the plane of the prong attachment surface 25 (longitudinally outwardly of the base 26), the prong 22 will converge from the base 26 towards the distal end and engaging means 30. Only if the angles $\beta_L$ and $\beta_T$ of the leading and trailing edges 42 and 46 have the same sense i.e., are oriented in the same direction, and supplementary magnitudes are the angles $\beta_L$ and $\beta_T$ of the leading and trailing edges 42 and 46 determined to be equal and the sides of the shank 28 to be parallel.

A shank 28 having a leading edge 42 which forms a leading edge angle $\beta_L$ with the prong attachment surface 25 of about 45°±30° is suitable. A trailing edge 46 which forms a trailing edge angle $\beta_T$ with the prong attachment surface 25 of about 65°±30° is suitable. A shank 28 having these angles $\beta_L$ and $\beta_T$ of the leading and trailing edges 42 and 46 works well with the aforementioned spectrum of included angles $\alpha$ of the shank 28 to yield a tapered shank 28, advantageously oriented relative to the prong attachment surface 25 to provide high shear and peel strengths without requiring excessive prong material.

The foregoing measurements are easily made using a Model 100-00 115 goniometer sold by Rame'-Hart, Inc. of Mountain Lakes, N.J. If more precise measurement is desired, it will be recognized by one skilled in the art that determination of the profile view, origin 36, cutting plane 40—40, leading angle $\beta_L$, trailing angle $\beta_T$, base points 50 and 52, 75% points 44 and 48, and the angle $\alpha$ of the shank 28 can be advantageously performed by making a photograph of the prong 22. A model 1700 scanning electron microscope sold by Amray, Inc. of New Bedford, Mass. has been found to work well for this purpose. If necessary, several photographs may be taken to determine the maximum lateral projection 38 and hence, either profile view.

The shank 28 should longitudinally project from the base 26 a distance sufficient to space the engaging means 30 from the protruding portions 23 of the substrate 24 at an elevation which allows the engaging means 30 to readily intercept or engage the strands of the receiving surface. A relatively longer shank 28 provides the advantage that it can penetrate deeper into the receiving surface and thereby allow the engaging means 30 to intercept or engage a greater number of strands or fibers. Conversely, a relatively shorter shank 28 length provides the advantage that a relatively stronger prong 22 results, but also provides correspondingly less penetration into the receiving surface and may therefore be unsuitable for receiving surfaces such as wool or loosely stitched bonded materials which have less densely packed strands or fibers.

If a knitted or woven material receiving surface is utilized, a relatively shorter shank 28 having a longitudinal length from the prong attachment surface 25 to the point or segment of highest elevation of about 0.5 millimeters (0.020 inches), preferably at least about 0.7 millimeters (0.028 inches), is suitable. If a high loft material receiving surface having a caliper greater than about 0.9 millimeters (0.035 inches) is utilized, a relatively longer shank 28 having a greater longitudinal dimension of at least about 1.2 millimeters (0.047 inches), preferably at least about 2.0 millimeters (0.079 inches), is more suitable. As the shank 28 length increases, and shear strength correspondingly diminishes, the density of the protruding portions 23 of the substrate 24 and correspondingly of the prongs 22 of the fastening system 20 may be increased to compensate for such loss of shear strength.

At this point, it can readily be discerned by one of skill in the art that a substrate protrusion 23 consisting of an embossed 19 or raised 21 portion will provide additional height to the prong 22 allowing the prong 22 to penetrate deeper into the receiving means. Another advantage to an embossed 19 area of a substrate 24 is the prongs increased "skin friendliness." Placing the prong on an embossed 19 area of the substrate 24 allows the prong 22 to encapsulate or submerge within the embossed 19 area when pressed against the skin. This encapsulation also allows the prongs 22 lock any fibers of a receiving surface by permitting the prong engaging means 30 opening to descend below the surface of the substrate 24. This locking phenomenon does not prevent the receiving surface from being removed from the engaging means 30 but, increases the hook's holding strength.

The substrate of the present invention having protuberances may also be used as a compressible substrate to form a skin friendly hook fastening material. Such a friendly hook fastening material and methods of making such a hook fastening material are disclosed in U.S. patent application Ser. No. 07/988,636, "Non-Abrasive Mechanical Fastening System And Process of Manufacture Therefore", filed Dec. 10, 1992, in the name of David J. K. Goulait et al. and is incorporated herein by reference.

As described above, the longitudinal length of the shank 28 determines the longitudinal spacing of the engaging means 30 from the prong attachment surface 25. The "longitudinal spacing" is the least perpendicular distance from the plane of the prong attachment surface 25 to the periphery of the engaging means 30. For an engaging means 30 of constant geometry, the longitudinal spacing of the engaging means 30 from the prong attachment surface 25 becomes greater with increasing longitudinal shank 28 length. A longitudinal spacing of at least about twice the strand or fiber diameter of the intended receiving surface, and preferably about 10 times as great as such fiber or strand diameter provides good interception or engagement and retention of such strands or fibers by the engaging means 30 of the fastening system 20. For the embodiment described herein, a prong 20 having a longitudinal spacing of about 0.2 millimeters to about 0.8 millimeters (0.008 to 0.03 inches) works well.

The shape of the cross section of the shank 28 is not critical. Thus the shank 28 may be of any cross section desired, according to the aforementioned parameters relating to the cross section of the base 26. The "cross section" is the planar area of any part of the prong 22 taken perpendicular to the shank 28 or the engaging means 30. As noted above, the shank 28 is preferably tapered to decrease in cross section as the distal end of the shank 28 and engaging means 30 of the prong 22 are longitudinally and laterally approximated. This arrangement provides a corresponding decrease in the moment of inertia of the shank 28 and engaging means 30 resulting in a prong 22 of more nearly constant stress when separation forces are applied to the fastening system 20, and thereby diminishes the quantity of superfluous materials incorporated into the prong 22.

To maintain the desired geometry over a wide range of prong 22 sizes, a generally uniform ratio of cross sectional areas can be utilized to scale the prongs 22. One ratio which generally controls the overall taper of the prong 22 is the ratio of the area of the prong attachment surface 25 and the cross section of the base 26 to the area of the cross section of the prong 22, at the highest elevation of the prong 22. The phrase "highest elevation" refers to the that point or segment of the shank 28 or the engaging means 30 having the greatest perpendicular distance from the plane of the prong attachment surface 25. Typically, prongs 22 having a base 26 cross sectional area to highest elevation cross sectional area ratio in the range of about 4:1 to about 9:1 work well.

A generally circular shank 28 which tapers from a base 26 diameter, as discussed above, ranging from about 0.76 millimeters to about 1.27 millimeters (0.030 to about 0.050 inches) to a highest elevation diameter, of about 0.41 millimeters to about 0.51 millimeters (0.016 to 0.020 inches) has been found suitable for the embodiment discussed herein. Recognizable by one skilled in the an is the fact that the area of the base conforms to the area of the prong attachment surface 25. Specifically, a generally circular shaped prong attachment surface 25 area cross section of about 0.46 millimeters (0.018 inches) diameter at the highest elevation provides a cross sectional area at highest elevation of about 0.17 square millimeters (0.0003 square inches). A generally circular shaped prong attachment surface 25 and base 26 cross section of about 1.0 millimeters (0.040 inches) provides a base 26 cross sectional area of about 0.81 square millimeters (0.0013 square inches). This structure results in a ratio of base 26 cross sectional area to highest elevation cross sectional area of about 5:1, which is within the aforementioned range.

The engaging means 30 is joined to the shank 28, and preferably is contiguous with the distal end of the shank 28. The engaging means 30 projects radially away and outwardly from the periphery of shank 28, and may further have a vector component which longitudinally projects, i.e. towards or away from the prong attachment surface 25. As used herein the term "engaging means" refers to any protrusion lateral to the periphery of shank 28 (other than minor asperities in the periphery of the shank 28), which protrusion resists separation or removal from a receiving surface. The term "periphery" means the outer surface of the prong 22. The term "radially" means from or towards the perpendicular to the prong attachment surface 25 or substrate 24, which perpendicular passes through the origin 36 which is generally centered within the footprint of the base 26.

Particularly, the lateral protrusion has a vector component parallel to and facing towards the plane of the prong attachment surface 25 and the substrate 24. It is to be recognized that the engaging means 30 and shank 28 may have both lateral and longitudinal vector components. It is not important that a sharply defined terminus of the shank 28 distal end be apparent, or that a demarcation between the shank 28 and engaging means 30 be discernible at all. It is only necessary that a longitudinally oriented face of the shank 28 periphery be interrupted so that the engaging means 30 has a face with a vector component parallel to and facing the plane of the prong attachment surface 25 and the substrate 24.

The engaging means 30 may have a greater lateral projection 38 than the shank 28, or vice-versa, as desired. As illustrated in the figures, the engaging means 30 is preferably generally arcuate and may have a reentrant curve. If the engaging means 30 has a reentrant curve, the engaging means 30 includes a segment which longitudinally approximates the prong attachment surface 25 or the substrate 24 at the base 26 or a location laterally spaced from the base 26. This segment is laterally directed towards the shank 28, although the segment need not be radially directed towards the origin 36.

The engaging means 30 of each prong 22 of the fastening system 20 may laterally extend substantially in the same direction, if a relatively unidirectionally oriented peel strength is desired, or may be randomly oriented to provide substantially isotropic peel strengths in any lateral direction. The engaging means 30 may be hook-shaped tines which project substantially from one side of the shank 28, defining a generally convex outline, and penetrate the opening of the receiving surface to intercept the strands or fibers of the receiving surface at the inner radius of curvature 54 of the engaging means 30. The interference between the engaging means 30 and strands or fibers of the receiving surface prevents release of the fastening system 20 from the receiving surface until the peel strength or shear strength of the fastening system 20 is exceeded. The engaging means 30 should not radially project too far in the lateral direction, otherwise the engaging means 30 may not penetrate the opening of the receiving surface. The cross section of the engaging means 30 should be sized to penetrate the openings of the receiving surface.

The cross sectional area and geometry of the engaging means 30 are not critical, so long as the engaging means 30 has structural integrity which provides sufficient shear and bending strengths to accommodate the desired peel and shear strengths of a fastening system 20 having an array of prongs 22 of a given density. For the embodiment described herein, a hook-shaped tine engaging means 30 having a maximum lateral projection 38 from the center of the base 26 to the remote lateral periphery of about 0.79 millimeters to about 0.90 millimeters (0.03 to 0.04 inches) is suitable.

The array of substrate protrusions 23 and correspondingly the prongs 22 may be of any pattern and density as desired, to achieve the peel and shear strengths required for the particular application of the fastening system 20. Generally as the array density increases, peel strength and shear strength proportionately increase in a linear fashion. The individual prongs 22 should not be so closely spaced as to interfere with and prevent the engaging means 30 of the adjacent prongs 22 from intercepting strands or fibers of the receiving surface. If the prongs 22 are too closely spaced, compacting or matting of the receiving surface strands or fibers may occur, occluding the openings between the strands or fibers. Conversely, the prongs 22 should not be so distantly spaced as to require an excessive area to provide a fastening system 20 of adequate shear and peel strengths.

It is advantageous to dispose the substrate protrusions 23 in rows, so that each prong 22 is generally equally spaced from the adjacent prong 22. Generally, the machine direction and cross-machine direction substrate protrusions 23 should be equally spaced from the adjacent machine direction and cross-machine direction substrate protrusions 23, to provide a generally uniform stress field throughout the fastening system 20 and the receiving surface when separation forces are applied to the fastening system 20 and the receiving surface.

As used herein the term "pitch" refers to the distance, measured either in the machine direction or cross-machine direction, between the centers of the substrate protrusions 23 and correspondingly the prong attachments surfaces 25 or the footprints of the bases 26 of prongs 22 in adjacent rows. Typically a fastening system 20 having an array of prongs 22 with a pitch ranging from about 1.02 millimeters to about 5.08 millimeters (0.04 to 0.20 inches) in both directions is suitable, with a pitch of about 2.03 millimeters (0.08 inches) being preferred. Adjacent cross-machine direction rows are preferably offset approximately one-half pitch in the cross-machine direction to double the distance in the machine direction between the adjacent cross-machine direction rows.

The substrate protrusions 23 and correspondingly the prongs 22 may be thought of as disposed in a matrix on a one square centimeter grid having an array of substrate protrusions 23 and correspondingly prongs 22 with about 2 to about 10 rows of prongs 22 per centimeter (5 to 25 rows per inch) in both the machine and cross-machine directions, preferably about 5 rows of prongs 22 per centimeter (13 rows per inch) in each direction. This grid will result in a fastening system 20 having about 4 to about 100 prongs 22 per square centimeter (25 to 625 prongs per square inch) of substrate 24.

The fastening system's 20 prongs 22 may be made of any thermally sensitive material which is stable and shape retaining when solid, but not so brittle that failure occurs when the fastening system 20 is subjected to separation forces. As used herein, "thermally sensitive" means a material which gradually changes from the solid state to the liquid state upon the application of heat. Failure is considered to have occurred when the prong 22 has fractured or can no longer sustain a reaction in the presence of and when subjected to separation forces. Preferably the material has an elastic tensile modulus, measured according to ASTM Standard D-638, of about 24,600,000 to about 31,600,000 kilograms per square meter (35,00 to 45,000 pounds per square inch).

Further, the prong material should have a melting point low enough to provide for easy processing and a relatively high viscosity to provide a tacky and tough consistency at temperatures near the material melting point, so that the shanks 28 may be stretched and the engaging means 30 easily formed according to the method of manufacture recited below. It is also important that the prongs 22 be viscoelastic, to allow for more variation in the parameters affecting prong 22 structure, and particularly the geometry of the engaging means 30. Material having a complex viscosity ranging from about 20 to about 100 Pascal seconds at the temperature of application to the substrate protrusions 23 is suitable.

The viscosity may be measured with a Rheometrics Model 800 Mechanical Spectrometer using the dynamic operating mode at a 10 Hertz sampling frequency and 10% material strain. A disk and plate type geometry is preferred, particularly with a disk having a radius of about 12.5 millimeters and a gap of about 1.0 millimeters between the disk and plate.

The prongs 22 are preferentially comprised of a thermoplastic material. The term "thermoplastic" refers to uncrosslinked polymers of a thermally sensitive material which flows under the application of heat or pressure. Hot melt adhesive thermoplastics are particularly well suited to manufacture the fastening system 20 of the present invention, particularly in accordance with the process described and claimed below. As used herein the phrase "hot melt adhesive" refers to thermoplastic compounds, normally solid at room temperature, which become fluid at elevated temperatures and which are applied in the molten state. Examples of hot melt adhesives may be found in the "Handbook Of Adhesives," Second Edition by Irving Skeist, published in 1977 by Van Nostrand Reinhold Company, 135 West 50th Street, New York, N.Y., 10020, which is incorporated herein by reference. Polyester and polyamide hot melt adhesives are particularly suitable and preferred. As used herein, the terms "polyester" and "polyamide" mean chains having repeating ester and amide units respectively.

If a polyester hot melt adhesive is selected, an adhesive having a complex viscosity of about 23±2 Pascal seconds at about 194° C. has been found to work well. If a polyamide hot melt adhesive is selected, an adhesive having a complex viscosity of about 90±10 Pascal seconds at about 204° C. has been found to work well. A polyester hot melt adhesive marketed by the Bostik Company of Middleton, Mass. as No. 7199 has been found to work well. A polyamide hot melt adhesive marketed by the Henkel Company of Kankakee, Ill. under the tradename Macromelt 6300 has been found to work well.

Figure 4:
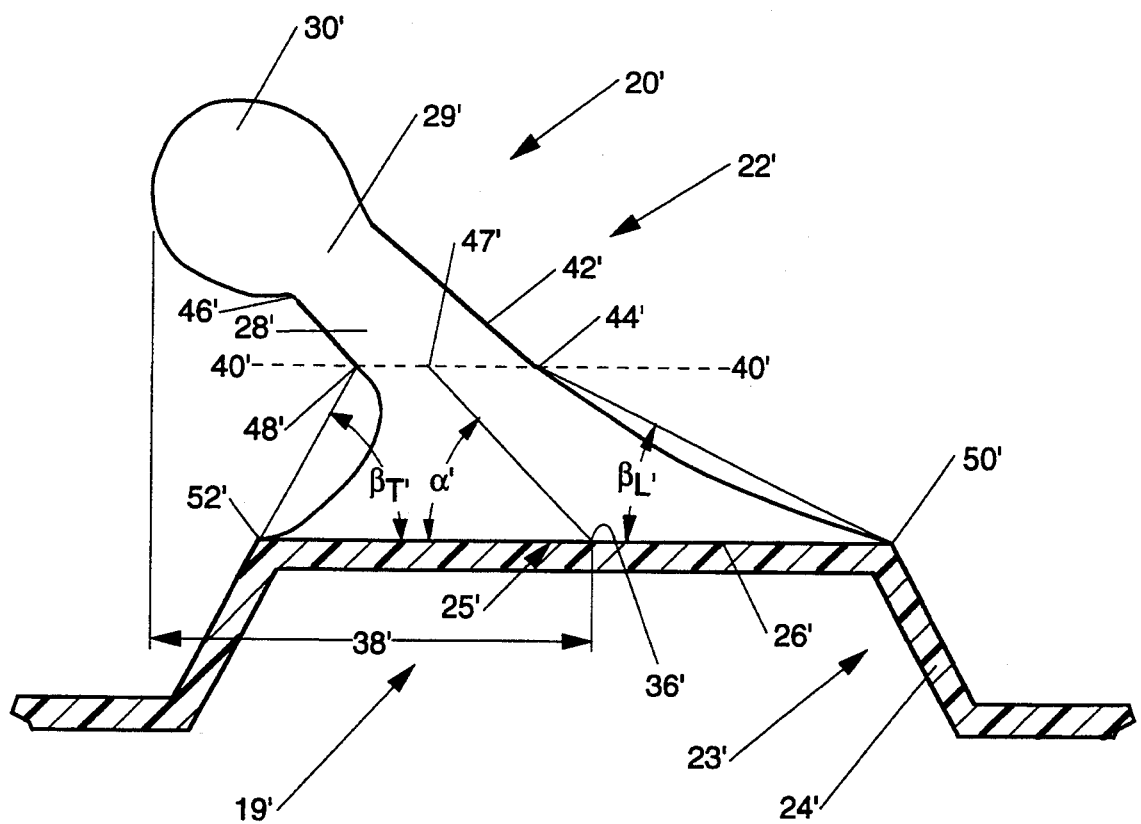
FIG. 4 is a schematic elevational view of a second embodiment having a generally semispherically shaped engaging means placed upon an emboss.

In a second embodiment of the fastening system 20', illustrated by FIG. 4, the engaging means 30' may be generally semispherically (mushroom) shaped. The term "semispherical" means a generally round shape, protruding in multiple directions and is inclusive of hemispheres and spheres, but not limited to regular shapes. This geometry, particularly the generally spherically shaped engaging means 30' structure, provides the advantage that less disturbance to the strands of the receiving surface typically occurs when the engaging means 30' is removed from the receiving surface. This causes less visible damage to the receiving surface, allowing it to be reused a greater number of times. If the semispherically shaped engaging means 30' is selected, the shank 28' is preferably more nearly orthogonal to the plane of the prong attachment surface 25, to allow easier penetration into the openings of the receiving surface and to reduce damage to the receiving surface as the engaging means 30' is released from the receiving surface. A shank 28' having an angle $\alpha'$ of about 70° to about 90° is suitable.

To provide a prong 22' of the proper proportions and having a generally semispherical engaging means 30', the engaging means 30' should radially protrude from the circumference of the shank 28' a lateral distance sufficient to intercept the strands of the receiving surface, but not protrude so far that the mass of the engaging means 30' is unable to be rigidly supported by the shank 28' or the shank 28' is otherwise unstable. As the angle $\alpha$ of the shank 28' decreases, i.e. deviates further from the perpendicular, the mass of the engaging means 30' relative to the shank 28' structural integrity and cross sectional area becomes more critical.

A tapered shank 28', having the base 26' to highest elevation cross sectional area and diameter ratios described above, and an angle $\alpha'$ of the shank 28' of about 80° works well. It is to be recognized the highest elevation measurements are to be taken from the highest elevation of the shank 28' and not from the engaging means 30'.

For an embodiment, as illustrated in FIG. 4, which does not have a smooth transition from the shank 28' to the engaging means 30', and for which the demarcation between the shank 28' and engaging means 30' is easily determined, the imaginary cutting plane 40'—40' is three-fourths of the perpendicular distance from the plane of the prong attachment surface 25 to the plane tangent to the point of the engaging means 30' which is longitudinally closest to the plane of the prong attachment surface 25. The cutting plane 40'—40' is then used to determine the angle $\alpha$ of the shank 28', the leading edge angle $\beta_L'$ and trailing edge angle $\beta_T'$ as described above.

The engaging means 30' should radially project, in each lateral direction, from the periphery of the distal end 29' of the shank 28' at least about 25 percent of the diameter of the distal end 29' of the shank 28', and preferably at least about 38 percent of such diameter. Alternatively stated, if the diameter of the distal end 29' of shank 28' is normalized to 1.0, the diameter of the engaging means 30' should be at least 1.5, and preferably at least 1.75 times the diameter of the distal end 29' of the shank 28'. Furthermore, the diameter of the base 26' should be about 2.0 times the diameter of the distal end 29' of the shank 28'. The shank 28' height should be about 1.5 to about 2 times the diameter of the distal end 29' of the shank 28', to properly longitudinally space the engaging means 30' from the prong attachment surface 25. The longitudinal dimension of the engaging means 30' may range from about 0.5 to about 1.5 times the diameter of the distal end 29' of the shank 28'.

The fastening system 20' of FIG. 4 is made by heating the engaging means 30 and distal end of the fastening system 20 of FIG. 2 to at least the melting point. This is accomplished by bringing the engaging means 30 and distal ends of the prongs 22 to a heat source longitudinally directed toward the plane of the substrate so that the base 26' and the proximal end of the shank 28' are not heated to at least the melting point. A suitable method is to bring the highest elevation of the prong to within about 3.3 millimeters to about 10.1 millimeters (0.1 to 0.4 inches) of a heat source, such as a hot wire heated to about 440° C.

The leading edge angle $\beta_L'$ and trailing edge angle $\beta_T'$ of the prong 22' will be similar to that of the corresponding hook-shag tine style engaging means prong 22, from which the semispherically shaped engaging means style prong 22' was formed. This occurs because the angle $\alpha$ or of the shank 28' and leading edge and trailing edge angles $\beta_L'$ and $\beta_T'$ do not substantially change as the engaging means 30 of FIG. 2 is heated and melted to flow into the engaging means 30' of FIG. 4.

For the aforementioned Milliken 970026 receiving surface, the engaging means 30' of FIG. 4 should preferably have a lateral and longitudinal dimension of about 0.029 millimeters to about 0.032 millimeters (0.001 inches), and be disposed on a shank 28' having a base 26' diameter of about 0.30 millimeters to about 0.045 millimeters (0.012 to 0.002 inches) and a diameter at the distal end 29' of about 0.016 millimeters to about 0.020 millimeters (0.0006 to 0.0007 inches). The distal end 29' of the shank 28' should be disposed between about 0.44 millimeters and about 0.50 millimeters (0.017 inches to 0.020 inches) above the plane of the prong attachment surface 25, and the engaging means 30' should have a lateral projection 38' of about 0.56 millimeters to about 0.70 millimeters (0.022 to 0.028 inches), preferably about 0.64 millimeters (0.025 inches).

PROCESS OF MANUFACTURE

The fastening system 20 according to the present invention may be manufactured using a process similar to gravure printing. Gravure printing is well known in the art as illustrated by U.S. Pat. No. 4,643,130 issued Feb. 17, 1988, to Sheath et al. and incorporated herein by reference to illustrate the state of the art similar to the present invention. Another reference which produces similar prongs is U.S. Pat. No. 5,116,563 issued May 26, 1992 to Thomas et al. and incorporated herein by reference.

Referring now to FIG. 5 the substrate 24 containing protrusions 23 is passed through the nip 70 formed between two rolls, a smooth print roll 72 and a backing roll 4. The rolls 72 and 74 have substantially mutually parallel centerlines disposed generally parallel to the plane of the prong attachment surface 25 and the substrate 24. The rolls 72 and 74 are rotated about the respective centerlines and have generally equal surface velocities, in both magnitude and direction, at the nip point 70. If desired, one or both the smooth print roll 72 and the backing roll 74 may be driven by an external motive force (not shown). An alternating current electric motor having an output of about 1,500 watts provides adequate motive force. By rotating, the rolls 72 and 74 actuate the substrate 24 causing the prong material to adhere to the prong attachment surface 25 of the substrate protrusions 23 of the substrate 24.

The smooth print roll 72 should be able to accommodate the temperature of the material of prongs 22 in the liquid state and provide substantially uniform pitch between the prongs 22 in both the machine and cross-machine directions. It can be gleaned, that by varying the cross-sectional area of the prong attachment surface 25 on the substrate protrusions 23 various base diameters 26 and shank heights will be produced.

The smooth print roll 72, provides for the depositing means to deposit the prongs 22 on the prong attachment surface 25. The pattern of the substrate protrusions 23 on the substrate 24 provides the desired array. The phrase "depositing means" refers to anything which transfers liquid prong material from a bulk quantity to the prong attachment surface 25. The term "deposit" means to transfer prong material from the bulk form and dose such material onto the prong attachment surface 25.

The cross sectional area of the prong attachment surface 25 and correspondingly the substrate protuberances 23 generally corresponds with the shape of the footprint of the base 26 of the prong 22. The cross section of the prong attachment surface 25 should be approximately equal to the desired cross section of the base 26. The depth of the prong material which is deposited upon the smooth print roll 72, in part, determines the longitudinal length of the prong 22, specifically the perpendicular distance from the base 26 to the point or segment of highest elevation.

For the embodiment described herein, the depth of the prong material spread upon the smooth print roll 72 should be between about 50 and about 70 percent of the diameter of the prong attachment surface 25.

The smooth print roll 72 and backing roll 74 should be coincident with the line connecting the centerlines of the rolls permitting the substrate protrusions 23 to collect prong material accumulated upon the smooth print roll 72 to be deposited upon the prong attachment surface 25 of the substrate 24.

The backing roll 74 should be somewhat softer and more compliant than the smooth print roll 72 to provide cushioning of the prong material as it is deposited on the prong attachment surface 25 from the smooth print roll 72. A backing roll 74 having a rubber coating with a Shore A durometer hardness of about 40 to about 60 is suitable.

The smooth print roll 72 temperature is not critical, however, the print roll 72 should be heated to prevent solidification of the prongs 22 during transfer from the source through the deposition on to the prong attachment surface 25. Generally a print roll 72 surface temperature near the source material temperature is desired. A smooth print roll 72 temperature of about 197° C. has been found to work well.

It is to be recognized that a chill roll may be necessary if the substrate 24 is adversely affected by the heat transferred from the prong material. If a chill roll is desired, it may be incorporated into the backing roll 74 using means well known to one skilled in the art. This arrangement is often necessary if a polypropylene, polyethylene or other polyolefinic substrates are used.

The material used to form the individual prongs 22 must be kept in a source which provides for the proper temperature to apply the prongs 22 to the prong attachment surface 25. Typically, a temperature slightly above the melting point of the material is desired. The material is considered to be at or above the "melting point" if the material is partially or wholly in the liquid state. If the source of the prong material is kept at too high a temperature, the prong material may not be viscous enough and may produce engaging means 30 which laterally connect to the prongs 22 adjacent in the machine direction. If the material temperature is very hot, the prong 22 will flow into a small, somewhat semispherically shaped puddle and an engaging means 30 will not be formed. Conversely, if the source temperature is too low, the prong material may not transfer from the source 80 to the smooth print roll 72 or, subsequently, may not properly transfer from the smooth print roll 72 to the prong attachment surface 25 of the substrate 24. The source of the material should also impart a generally uniform cross-machine direction temperature profile to the material, be in communication with the means for depositing the adhesive material onto the prong attachment surface 25 of the substrate 24 and easily be replenished or restocked as the prong material becomes depleted.

A suitable source is a trough 80, substantially coextensive of that portion of the cross-machine dimension of the smooth print roll 72 and adjacent thereto. The trough 80 has a closed end bottom, an outboard side and ends. The top may be open or closed as desired. The inboard side of the trough 80 is open, allowing the liquid material therein to freely contact and communicate with the circumference of the smooth print roll 72.

The source is externally heated by known means (not shown) to maintain the prong material in a liquid state and at the proper temperature. The preferred temperature is above the melting point but below that at which a significant loss of viscoelasticity occurs. If desired, the liquid material inside the trough 80 may be mixed or recirculated to promote homogeneity and an even temperature distribution.

Juxtaposed with the bottom of the trough 80 is a doctor blade 82 which controls the amount of prong material applied to the smooth print roll 72. The doctor blade 82 and trough 80 are held stationary as the smooth print roll 72 is rotated, allowing the doctor blade 82 to wipe the circumference of the roll 72 and scrape any prong material which is applied at a depth of greater then the depth intended to be deposited upon the smooth print roll 72 and allows such material to be recycled. This arrangement allows prong material to be deposited from the smooth applicator roll 72 on to the prong attachment surface 25 in the desired array, according to the geometry of the substrate protuberances 23. As seen in FIG. 5, the doctor blade 82 is preferentially disposed in the horizontal plane, particularly the horizontal apex of the smooth print roll 72, which apex is upstream of the nip point 70.

After being deposited onto the prong attachment surface 25, the prongs 22 are severed from the smooth applicator roll 72 by a means for severing 78 the prongs 22 into the engaging means 30 of the fastening system 20 and a moil. As used herein the term "moil" refers to any material severed from the prong 22 and which does not form part of the fastening system 20.

The severing means 78 should be adjustable to accommodate various sizes of prongs 22 and lateral projections 38 of engaging means 30 and also provide uniformity throughout the cross-machine direction of the array. The term "severing means" refers to anything which longitudinally separates the moil from the fastening system 20. The term "sever" refers to the act of dividing the moil from the fastening system 20 as described above. The severing means 78 should also be clean and should not rust, oxidize or impart corrodents and contaminates (such as moil material) to the prongs 22. A suitable severing means is a wire 78 disposed generally parallel to the axis of the rolls 72 and 74 and spaced from the substrate protrusions 23 a distance which is somewhat greater than the perpendicular distance from the highest elevation of the solidified prong 22 to the substrate protuberances 23.

Preferably the wire 78 is electrically heated to prevent build-up of the molten prong material on the severing means 78, accommodate any cooling of the prongs 22 which occurs between the time the prong material leaves the heated source and severing occurs and to promote lateral stretching of the engaging means 30. The heating of the severing means 78 should also provide for uniform temperature distribution in the cross-machine direction, so that an array of prongs 22 having substantially uniform geometry is produced.

Generally, as the prong material temperature increases a relatively cooler hot wire 78 temperature severing means can be accommodated. Also, as the speed of the substrate 24 is decreased, less frequent cooling of the hot wire 78 occurs as each prong 22 and moil are severed, making a relatively lower wattage hot wire 78 more feasible at the same temperatures. It should be recognized that as the temperature of the hot wire 78 is increased a prong 22 having a generally shorter shank 28 length will result. Conversely, the shank 28 length and lateral length of the engaging means 30 will be increased in inverse proportion as the temperature of the hot wire 78 is decreased. It is not necessary that the severing means 78 actually contact the prong 22 for severing to occur. The prong 22 may be severed by the radiant heat emitted from the severing means 78.

For the embodiment described herein a round cross section nickel-chromium wire 78, having a diameter of about 0.51 millimeters (0.02 inches) heated to a temperature of about 343° C. to about 416° C. has been found suitable. It will be apparent that a knife, laser cutting or other severing means 78 may be substituted for the hot wire 78 described above.

It is important that the severing means 78 be disposed at a position which allows stretching of the prong material to occur prior to the prong 22 being severed from the moil. If the severing means 78 is disposed too far from the plane of the prong attachment surface 25, the prong material will pass underneath the severing means 78 and not be intercepted by it, forming a very long engaging means 30 which will not be properly spaced from the prong attachment surface 25 or adjacent prongs 22. Conversely, if the severing means 78 is disposed too close to the plane of the prong attachment surface 25, the severing means 78 will truncate the shank 28 and an engaging means 30 may not be formed.

A hot wire severing means 78 disposed approximately 14 millimeters to 22 millimeters (0.56 to 0.88 inches), preferably about 18 millimeters (0.72 inches) in the machine direction from the nip point 70, approximately 4.8 millimeters to 7.9 millimeters (0.19 to 0.31 inches), preferably about 6.4 millimeters (0.25 inches) radially outward from the backing roll 74 and approximately 1.5 millimeters to approximately 4.8 millimeters (0.06 to 0.19 inches), preferably about 3.3 millimeters (0.13 inches) radially outwardly from the smooth print roll 72 is adequately positioned for the process of manufacture disclosed herein.

In operation, the substrate 24, with protrusions 23 having a prong attachment surface 25, is transported in a first direction relative to the depositing means 76. More particularly, the substrate 24 is transported through the nip 70, preferentially drawn by a take-up roll (not shown). This provides a clean area of substrate 24, with protrusions 23, for continuous deposition of prongs 22 upon the prong attachment surface 25 of the substrate 24 and removes the portions of the substrate 24 having prongs 22 deposited thereon. The direction generally parallel to the principal direction of transport of the substrate 24 as it passes through the nip 70 is referred to as the "machine direction." The machine direction, as indicated by the arrow 75 of FIG. 5, is generally orthogonal the centerline of the smooth print roll 72 and backing roll 74. The direction generally orthogonal to the machine direction and parallel to the plane of the substrate 24 is referred to as the "cross-machine direction."

The substrate 24 may be drawn through the nip 70 at a speed approximately 2% to approximately 10% greater than the surface speed of the rolls 72 and 74. This is done to minimize bunching or puckering of the substrate 24 near the means for severing 78 the prongs 22 from the means for depositing the prong material on the prong attachment surface 25. The substrate 24 is transported through the nip 70 in the first direction at about 3 to about 31 meters per minute (10 to 100 feet per minute).

The angle $\alpha$ of the shank 28 can be influenced by the rate of transport of the substrate 24 past the nip 70. If prongs 22 having a shank angle a more nearly perpendicular to the prong attachment surface 25 is desired, a slower rate of transport of the substrate 24 in the first direction is selected. Conversely, if the rate of transport is increased, the angle $\alpha$ of the shank 28 decreases and an engaging means 30 have a greater lateral projection 38 will result.

If desired, the substrate 24 may be inclined at an angle E, approximately 35° to approximately 55°, preferably about 45°, from the plane of the nip 70 towards the backing roll 74 to utilize the viscoelastic nature of the prong material and properly orient the engaging means 30 in the lateral direction, as well as longitudinal direction. This arrangement also provides a greater force to pull the prong 22 away from the print roll 72. The angle E from the plane of the nip 70 should be increased as a lesser angle $\alpha$ of the shank 28 is desired. Also, increasing the angle E of deviation from the plane of the nip 70 has a weak, but positive effect to produce engaging means 30 having a greater lateral projection 38.

After depositing prong material from the smooth applicator roll 72 onto the prong attachment surface 25, the rolls 72 and 74 continue rotation, in the directions indicated by the arrows 75 of FIG. 5. This results in a period of relative displacement between the transported substrate 24 and the smooth print roll 72 during which period (prior to severing) the prong material bridges the prong attachment surface 25 and print roll 72. As relative displacement continues, the prong material is stretched until severing occurs and the prong 22 is separated from the smooth applicator roll 72. As used herein the term "stretch" means to increase in linear dimension, at least a portion of which increase becomes substantially permanent for the life of the fastening system 20.

As discussed above, it is also necessary to sever the individual prongs 22 from the smooth applicator roll 72 as part of the process which forms the engaging means 30. When severed, a prong 22 is longitudinally divided into two parts, a distal end and engaging means 30 which remain with the fastening system 20 and a moil (not shown) which remains with the smooth applicator roll 72 and may be recycled, as desired. After the prongs 22 are severed from the moil, the fastening system 20 is allowed to freeze prior to contact of the prongs 22 with other objects. After solidification of the prongs 22, the substrate 24 may be wound into a roll for storage as desired.

A nonlimiting illustration of the process shows the prong material to be disposed in the trough 80 and heated by means commonly known to one skilled in the art, to a temperature somewhat above the melting point. If a polyester resin hot melt adhesive is selected, a material temperature of approximately 177°–193° C., preferably about 186° C. has been found suitable. If a polyamide resin is selected, a material temperature of approximately 193°–213° C., preferably about 200° C. has been found suitable. A one sided bleached kraft paper substrate 24 having protrusions 23 about 0.008 to about 0.15 millimeters (0.003 to 0.006 inches) in thickness works well with hot melt adhesive prongs 22. The prongs 22 are joined to the prong attachment surface 25 on the bleached side of the kraft paper substrate 24.

For the illustrated operation described herein, a substrate with protrusions 23 having an array of 8 rows of protuberances 23 per centimeter (20 rows per inch), yielding 64 protuberances 23 per square centimeter (400 per square inch), is suitable. This grid density may be advantageously used with a smooth application roll 72 having a diameter of about 16 centimeters (6.3 inches), in diameter. A backing roll 74 having a diameter of about 15.2 centimeters (6.0 inches) and vertically registered has been found to work well with the aforementioned smooth application roll 72. The rate of transport of the substrate 24 is about 3.0 meters per minute (10 feet per minute).

A nickel-chromium hot wire 78 having a diameter of about 0.5 millimeters (0.02 inches) disposed approximately 18 millimeters (0.72 inches) from the nip point 70 in the machine direction, approximately 0.3 millimeters (0.13 inches) radially outwardly from the print roll 72 and approximately 6.4 millimeters (0.25 inches) radially outwardly from the backing roll 74 is heated to a temperature of about 382° C. The fastening system 20 produced by this operation is substantially similar to that illustrated by FIG. 1, which fastening system 20 may be advantageously incorporated into the illustrative article of use discussed below.

Without being bound by any particular theory, it is believed that the geometry of the engaging means 30 is governed by the differential cooling of the prong 22. The trailing edge 46 of the prong 22 is shielded and insulated from the heat originating from the severing means 78. Conversely, the leading edge 42 is directly exposed to the heat of the severing means 78, which causes the leading edge 42 to cool more slowly than the rate at which the trailing edge 46 cools. The resulting differential cooling rate causes elongation of the leading edge 42 and contraction of the trailing edge 46, relative to each other. As this differential cooling rate is increased, a relatively longer engaging means 30 is formed.

Figure 6:
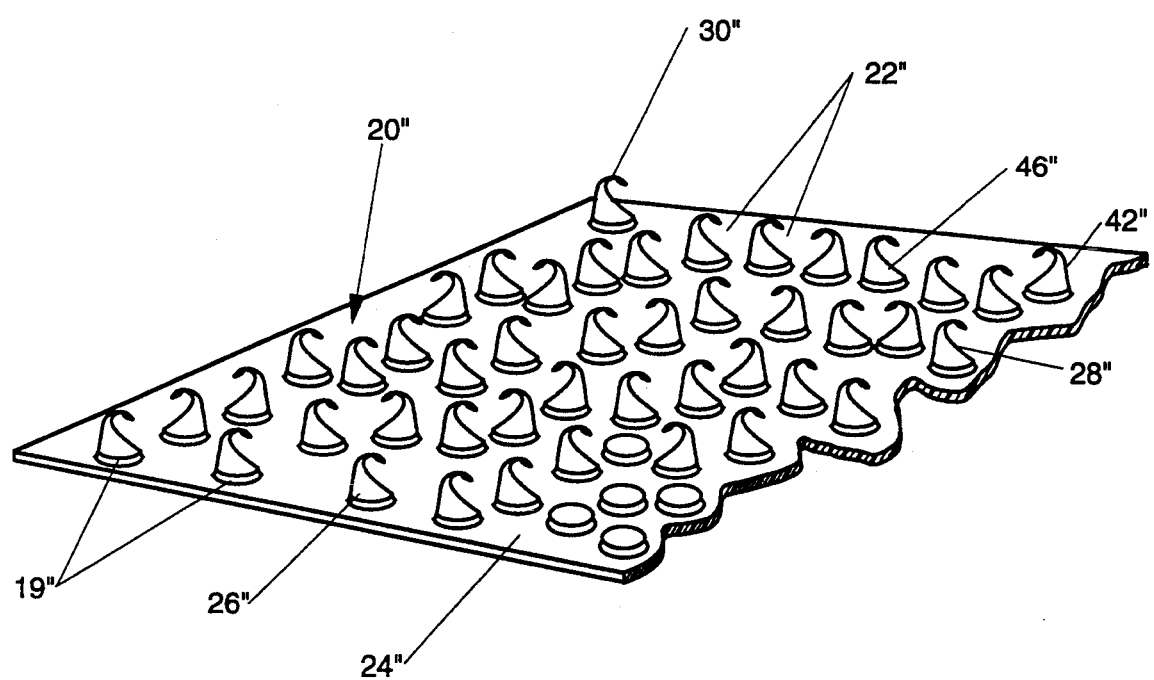
FIG. 6 is a perspective view of a fastening system of the present invention wherein the engaging means are oriented in substantially random directions and placed upon an emboss.

Referring to FIG. 6, if a fastening system 20″ of more nearly isotropic peel strength is desired, such a fastening system 20″ may be formed by modifying the fastening system 20 of FIG. 1 through a second stage differential temperature process. As illustrated in FIG. 6, the fastening system 20 of FIG. 1 is further processed to provide shanks 28″ with engaging means 30″ which radially extend from the shanks 28″ in various lateral directions of a generally random orientation. The phrase "random orientation" means having lateral projections and profile views which significantly deviate in direction from those of the nearby prongs 22″.

This structure is accomplished by establishing a temperature differential between the profile surfaces or leading surfaces 42 and the trailing surfaces 46 of the prongs 22 of the fastening system 20 of FIG. 1. Such temperature differential may be enhanced by radiation or preferably convection.

Upon attaining a temperature differential of the leading surface 42″ or the profile surfaces relative to the trailing surface 46′, the engaging means 30″ will substantially change or even reverse the orientation of lateral projection, providing a prong 22″ which is oriented in a direction other than that which occurred when initially cooled or frozen. The differential temperature may be established by any source known to one skilled in the art, such as a heated wire or metal element, and preferably an air gun 84, disposed above the prongs 22″ and capable of providing a directed temperature differential to the fastening system 20″.

It is desired that the directed temperature differential source direct an air current towards the fastening system 20″ within about ±90° of the first direction of the substrate 24″ travel, which is the machine direction. As used herein, the phrase "±90° of the first direction" means a direction having a vector component generally perpendicular to or generally counter to the first direction of travel of the substrate 24″ and is inclusive of the direction generally opposite the first direction of travel.

If the directed temperature differential source 84 is disposed at an angle of about 180° relative to the first direction of travel of the substrate 24″, the source 84 is directed towards the leading surfaces 42″ of the prongs 22″ of the fastening system 20″, and generally opposite the machine direction of the process described and claimed herein. Directing the temperature differential of source 84 directly towards the leading surface 42″ of a prong 22″ will result in the lateral projection 38″ of the engaging means 30″ rotating, to change the orientation of the lateral projection about 180°. Prongs 22″ disposed somewhat to the side, i.e. in the cross-machine direction of the directed temperature differential source 84 will not have the engaging means 30″ rotated about 180°, but instead engaging means 30″ more nearly rotated about 90°. Thus, it is apparent that a directed temperature differential source 84 oriented in the cross-machine direction will provide a fastening system 20″ having prongs 22″ with various lateral orientations in the cross-machine direction according to the prong 22″ position relative to the temperature differential source 84.

An air gun 84 discharging air at a temperature of about 88° C. at a distance of about 46 centimeters (18 inches) from the substrate 24″ is a suitable differential temperature source. A 133–348 series heat gun sold by the Dayton Electric Manufacturing Company of Chicago, Ill. oriented at about 45° relative to the plane of the substrate 24" and disposed about 46 centimeters (18 inches) from the prongs produces a fastening system 20" pattern substantially similar to that shown in FIG. 6. It will be apparent to one skilled in the art that one or more hot wires disposed above the prongs 22" and oriented in the machine direction will produce a fastening system 20" having cross machine directionally oriented engaging means 30" in a regular, somewhat striped pattern.

Without being bound by any theory, it is believed that the change in orientation of the engaging means 30" occurs due to the cooling of the profile surfaces or the leading surface 42" of the prong 22" relative to the trailing surface 46", which may occur if the temperature of the discharged air from the directed temperature source differential source 84 is less than the temperature of the periphery of such profile surfaces or leading surface 42". The temperature differential resulting from the cooling causes contraction of the portion of the prong 22" towards which the temperature differential source 84 is directed. This contraction may result in a change in the orientation of the engaging means 30" and lateral projection 38", due to the differential cooling of the leading surface 42" relative to the trailing surface 46". Without being bound by further theory, it is believed that relief of residual stresses which occur during cooling may influence the change in orientation of the lateral projection 38".

It will be further to apparent to one skilled in the art that other variations are feasible. For example, a prong 22 having an engaging means 30 protruding in more than one direction may be formed or free formed prongs 22 may be produced by commonly known methods other than the methods herein described. If desired, only one roll may be utilized in the manufacturing process, providing, the prong attachment surface 25 contacts at least about 180" of the periphery of such roll.

Figure 7:
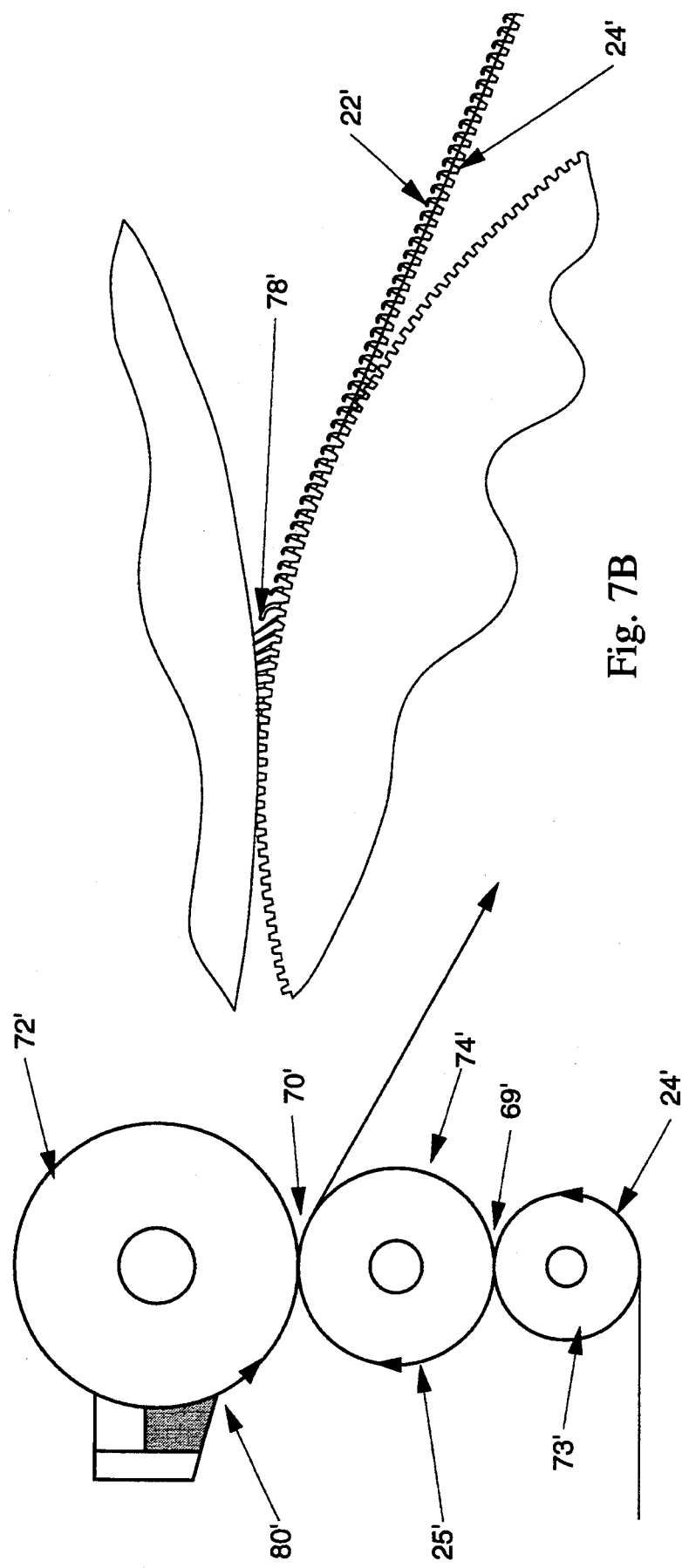
FIG. 7 is a schematic side elevational view of another apparatus which can be used to both emboss a suitable substrate and produce the fastening system of the present invention.

Referring to FIG. 7, if desired, and without being limited by theory, the process for creating embossed areas 19 on a substrate 24' can be incorporated into the prong printing process, thereby embossing the substrate 24' and printing the prongs 22' in a single continuous procedure. The substrate 24' is passed through the nip 69' formed between two rolls, a rubber impression roll 73' and a steel embossing roll 74'. The rubber impression roll 73' and the steel embossing roll 74' should be coincident with the line connecting the centerlines of the rolls. The rubber impression roll 73' provides elastic cushioning enabling the embossing roll 74' to emboss the substrate 24' with raised three dimensional impressions or embosses 19 and creating a prong attachment surface 25. The embossing roll 74' contains on its surface numerous raised knobs that when pressed against the substrate 24 and the rubber impression roll 73 as it passes through the nip 69', stretches the substrate producing an array of embosses 19 corresponding to the pattern of knobs contained on the embossing roll 74'. The now embossed substrate 25' follows the embossing roll 74' through another nip 70' formed between two rolls, the embossing roll 74' and the smooth applicator roll 72' where prongs are placed upon the prong attachment surface 25 of the embossed substrate 25'. Subsequent modifications and changes in the process and the profile and capabilities of the prongs may be made as described above.

ILLUSTRATIVE ARTICLE OF USE

Figure 8:
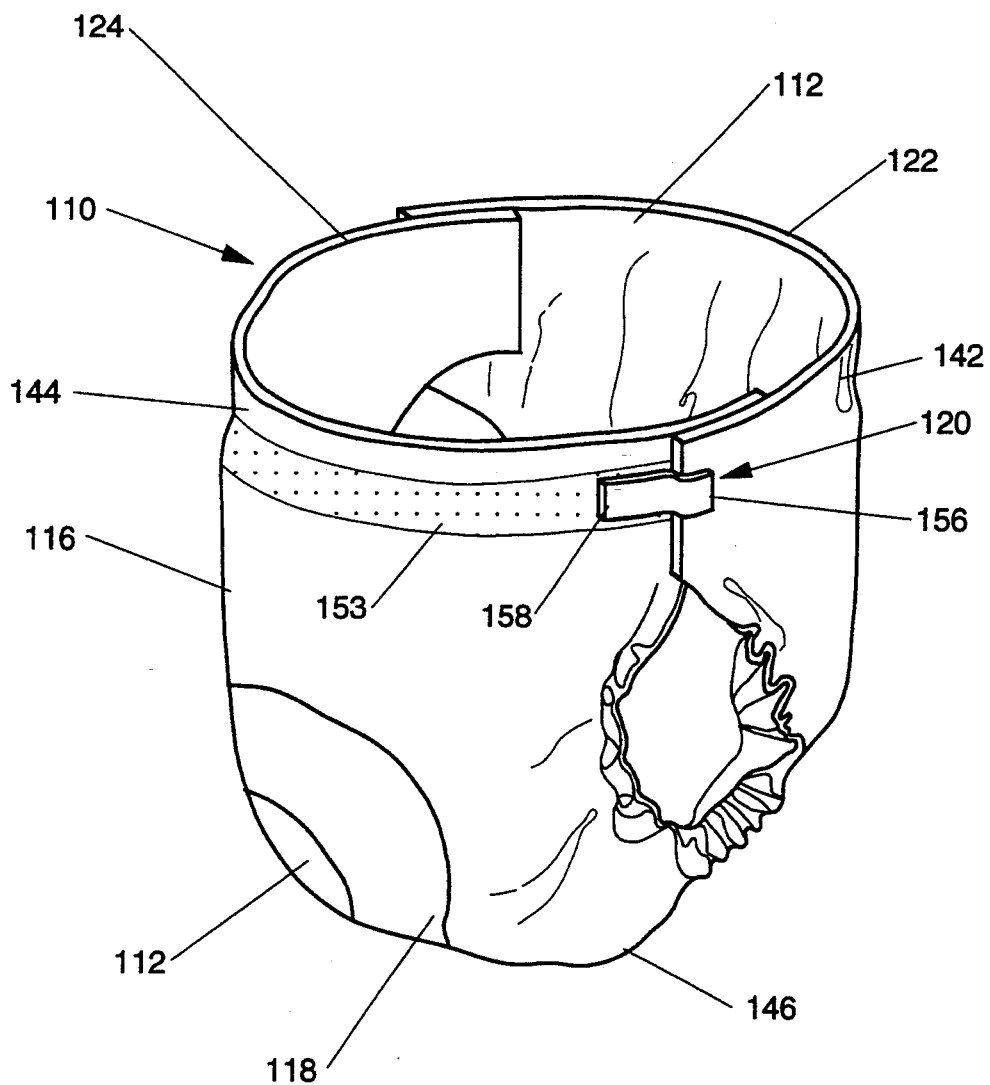
FIG. 8 is a perspective view of a disposable absorbent garment utilizing the fastening system of the present invention.

An illustrative and nonlimiting example of the usage of the fastening system 20 of the present invention in an article of manufacture follows and is illustrated in FIG. 8. Mechanical fastening systems have been advantageously used in disposable absorbent articles as disclosed in U.S. Pat. 4,846,815, issued Jul. 11, 1989 to Scripps, which is incorporated herein by reference for the purpose of showing a diaper 110 structure and the advantageous utilization of mechanical fastening systems 20 in such diaper 120 structures.

It is known, for example, that mechanical fastening systems 120 are less easily contaminated by oils and powders than are adhesive tape fastening systems and, further, may be easily reused. All of these features provide advantages when applied to a disposable diaper 110 intended for use on an infant. Also, a refastenable fastening system provides the advantage that the infant may be checked to see if soiling of the disposable diaper 110 has occurred during the wearing period.

Referring to FIG. 8, there is shown a disposable diaper 110 intended to be worn about the lower torso by an infant. As used herein, the term "disposable absorbent article" refers to a garment generally worn by infants or incontinent persons and which is drawn between the legs, fastened about the waist of the wearer and intended to be discarded after a single use and not to be laundered or restored. A "disposable diaper" is a particular disposable article intended and scaled to be worn by an infant.

A preferred diaper 110 comprises a liquid pervious topsheet 112, a liquid impervious backsheet 116, and an absorbent core 118 intermediate to the topsheet 112 and backsheet 116. The topsheet 112 and backsheet 116 are at least partially peripherally joined to ensure the core 118 is held in position. The diaper 110 elements may be assembled in a variety of configurations well known to one skilled in the art, with a preferred configuration being generally described in U.S. Pat. No. 3,860,003 issued Jan. 14, 1975 to Buell, which patent is incorporated herein by reference for the purpose of disclosing a particularly preferred diaper 110 configuration.

The topsheet 112 and backsheet 116 of the diaper 110 are generally coextensive and at least partially peripherally joined together as noted above. Joining of the topsheet 112 and backsheet 116 may be accomplished by a hot-melt adhesive, such as Eastobond A3 manufactured by the Eastman Chemical Products Company of Kingsport, Tenn. The absorbent core 118 has length and width dimensions generally less than that of the topsheet 112 and backsheet 116. The core 118 is interposed between the topsheet 112 and backsheet 116 in fixed relationship.

The diaper 110 periphery comprises oppositely disposed first and second ends 122 and 124. The diaper 110 has a first waist portion 142 and a second waist portion 144 extending respectively from the first end 122 and second end 124 of the diaper 110 periphery towards the lateral centerline of the diaper 110 a distance of about one-fifth to about one-third the length of the diaper 110. The waist portions 142 and 144 comprise those portions of the diaper 110 which, when worn, encircle the waist of the wearer and are generally at the highest elevation of the diaper 110 when the wearer is in the standing position. The crotch 146 of the diaper 110 is that portion of the disposed between the first and second waist portions 142 and 144 and which, when worn is positioned between the legs of the wearer.

The absorbent "core" is any means for absorbing and retaining liquid body exudates. The absorbent core 118 is generally compressible, conformable, and nonirritating to the skin of the wearer. A preferred core 118 has first and second opposed faces and may, if desired, be further encased by tissue layers. One opposed face of the core 118 is oriented towards the topsheet 112 and the other opposed face is oriented towards the backsheet 116.

The absorbent core 118 is superimposed on the backsheet 116 and preferably joined thereto by any means well known in the art such as adhesive bonding. In a particularly preferred embodiment, adhesive bonding is accomplished by longitudinal adhesive bands which join the core 118 to the backsheet 116. The backsheet 116 is impervious to liquids and prevents liquids absorbed by and contained in the absorbent core 118 from wetting undergarments, clothing, bedding and any other objects which contact the diaper 110. As used herein, the term "backsheet" refers to any barrier disposed outwardly of the core 118 as the diaper 110 is worn and which contains absorbed liquids within the diaper 110. Preferably, the backsheet 116 is a polyolefinic film of about 0.012 to about 0.051 mm (0.0005–0.002 inches) in thickness. A polyethylene film is particularly preferred, with a suitable film being manufactured by the Monsanto Company of St. Louis, Mo. as film No. 8020. If desired, the backsheet 116 may be embossed or matte finished to provide a more clothlike appearance or be provided with passages to permit escape of vapors.

The topsheet 112 is compliant, tactily pleasing and nonirritating to the wearer's skin. The topsheet 112 prevents contact of the absorbent core 118 and liquids therein with the skin of the wearer. The topsheet 112 is liquid pervious, permitting liquids to readily penetrate therethrough. As used herein, the term "topsheet" refers to any liquid pervious facing which contacts the skin of the wearer while the diaper 110 is being worn and prevents the core 118 from contacting the skin of the wearer. The topsheet 112 may be made of woven or nonwoven materials. A preferred topsheet 112 is carded and thermally bonded by means to those skilled in the nonwoven fabrics art. A particularly preferred topsheet 112 has a weight of about 18 to about 25 grams per square meter, a minimum dry tensile strength of about 400 grams per centimeter in the machine direction and a wet tensile strength of at least about 550 grams per centimeter in the cross-machine direction.

The diaper 110 is provided with a fastening system 120 and receiving surface 153 for maintaining the first waist portion 142 and second waist portion 144 in an overlapping configuration when the diaper 110 is worn, so that the diaper 110 is secured to the wearer. Thus, the diaper 110 is fitted to the wearer and a side closure is formed when the fastening system 120 is secured to the receiving surface 153.

The fastening system 120 should resist the separation forces which occur during the wearing period. The term "separation forces" refers to forces acting on the fastening system 120 and receiving surface 153 which tend to cause separation, release or removal of the fastening system 120 from the receiving surface 153. Separation forces include both shear and peel forces. The term "shear force" refers to distributive forces acting generally tangential to the receiving surface 153 and which may be thought of as being generally parallel to the plane of the substrate of the fastening system 120. The term "peel forces" refers to distributive forces acting in the generally longitudinal direction, and perpendicular to the plane of the receiving surface 153 and fastening system 120 substrates.

Shear forces are measured by tensile pulling of the fastening system 120 and receiving surface 153 in opposite directions generally parallel to the planes of the respective substrates. The method used to determine the resistance of a fastening system 120 and receiving surface 153 to shear forces is more fully set forth in U.S. Pat. 4,699,622 issued Oct. 13, 1987, to Toussant et at., which patent is incorporated herein by reference for the purpose of describing the measurement of shear forces.

Peel forces are measured by tensile pulling of the fastening system 120 from the receiving surface 153 at an included angle of about 135°. The method used to determine the resistance of a fastening system 120 and receiving surface 153 to peel forces is more fully set forth in U.S. Pat. No. 4,846,815, issued Jul. 11, 1989, to Scripps, which is incorporated herein by reference for the purpose of describing the measurement of peel forces.

Separation forces are typically generated by movements of the wearer or by the wearer trying to unfasten the diaper 110. Generally, an infant should not be able to unfasten or remove a diaper 110 the infant is wearing, nor should the diaper 110 come unfastened in the presence of ordinary separation forces which occur during normal wearing. However, an adult should be able to remove the diaper 110 to change it when soiled or check to see if soiling has occurred. Generally, the fastening system 120 and receiving surface 153 should resist a peel force of at least 200 grams, preferably at least about 500 grams, and more preferably, at least about 700 grams. Furthermore, the fastening system 120 and receiving surface 153 should resist a shear force of at least 500 grams, preferably at least about 750 grams, and more preferably at least about 1,000 grams.

The receiving surface 153 may be disposed in a first position anywhere on the diaper 110, so long as the receiving surface 153 engages the fastening means to maintain the first and second waist portions 144 in an overlapping configuration. For example, the receiving surface 153 may be disposed on the outside surface of the second waist portion 144, on the inside surface of the first waist portion 142, or any other position on the diaper 110 on which it is disposed so as to engage with the fastening system 120. The receiving surface 153 may be integral, a discrete element joined to the diaper 110, or a single piece of material that is neither divided or discontinuous with an element of the diaper 110, such as the topsheet 112 or backsheet 116.

While the receiving surface 153 may assume various sizes and shapes, the receiving surface 153 preferably comprises one or more integral patches positioned across the outside surface of the second waist portion 144 to allow for maximum fit adjustment at the waist of the wearer. As illustrated in FIG. 8, the receiving surface 153 is preferably an elongate rectangularly shaped integral member secured to the outer surface of the second waist portion 144.

A suitable receiving surface 153 is stitch bonded, nonwoven fabric or any other type of fiber or loop material well known in the art. The receiving surface 153 may be manufactured from a variety of materials which provide fiber elements, and preferably loops capable of being intercepted and retained by the engaging means. Suitable materials include nylon, polyester, polypropylene and combinations of the foregoing. A suitable receiving surface 153 comprises a number of fiber loops projecting from a woven and is commercially available as Scotchmate brand nylon woven loop No. FJ3401, sold by the Minnesota Mining and Manufacturing Company of St. Paul, Minn. Another suitable receiving surface 153 comprises a tricot having a plurality of nylon filament loops projecting from a nylon backing and is commercially available form Gilford Mills of Greensboro, N.C. and designated and designated Gilford No. 16110. A particularly preferred receiving surface is stitchbonded loop material sold by the Milliken Company of Spartanburg, S.C. under Number 970026.

The fastening system 120 is intended to engage the complementary receiving surface 153 to provide a secure fit for the diaper 110. The fastening system 120 may comprise any of the well known configurations utilized for achieving a side closure on a disposable diaper 110. The fastening system 120 substrate is joined to the diaper 110 in spaced relationship from the receiving means 153. As shown on FIG. 8, the fastening system 120 is preferably disposed on both the first and second longitudinal sides of the diaper 110. A preferred configuration for the fastening system 120 minimizes any potential contact between the prongs of the fastening system 120 and the skin of the wearer. A preferred fastening system 120 disposition is a Y-shaped tape arrangement, described in detail in U.S. Pat. No. 3,848,594 issued Nov. 19, 1974 to Buell. An alternatively preferred fastening system 120 arrangement is described in detail in U.S. Pat. No. 4,699,622 issued Oct. 13, 1987 to Toussant et al., both of which patents are incorporated herein by reference for the purpose of illustrating various placements of the fastening system 120 on the disposable diaper 110.

The fastening system 120 of FIG. 8 has a manufacturer's end 156 and an oppositely disposed user's end 158. The manufacturer's end 156 is joined to the diaper 110, preferably in juxtaposition with the first waist portion 142. The user's end 158 is the free end and is secured to the receiving surface 153 when the diaper 110 is secured to the wearer.

After the diaper 110 is fitted about the waist of the wearer, the user's end 158 of the fastening system 120 is releasably secured to the receiving surface 153, and preferably positioned on the second waist portion 144, thereby causing the diaper 110 to encircle the waist of the wearer. The diaper 110 has now effected a side closure. The prongs (not shown) extend from the fastening system 120 of the user's end 158 so that the prong engaging means intercept the strands of the receiving surface 153.

A fastening system 120 and complementary receiving surface 153 which provides a resistance to peel forces in excess of 700 grams and a resistance to shear forces in excess of 1,000 grams may be constructed as follows according to the specific parameters of the fastening system 120 set forth in the aforementioned "Process of Manufacture." The complementary receiving surface 153 used in conjunction with the fastening system 120 is the aforementioned Milliken Company No. 970026 stitchbonded loop fabric.

The fastening system 120 is at least about 2.54 centimeters (1 inch) in width and may be of any length which provides a convenient user's end 158, with a length of at least about 3.5 centimeters (1.4 inches) being preferred. The array of the prongs of fastening system 120 comprises a matrix having about 26 prongs per square centimeter (169 prongs per square inch). The prongs are preferentially oriented in substantially the same direction and face the user's end 158 of the fastening tape.

In use, the diaper 110 is applied to the wearer by positioning the first waist portion 142 around the wearer's back and drawing the remainder of the diaper 110 between the legs of the wearer so that the second waist portion 144 is disposed across the front of the wearer. The user's ends 158 of the fastening system 120 are then secured to the receiving surface 153 on the outside surface of the second waist portion 144 to form a side closure.

What is claimed is:

1. A process for making a fastening system comprising one or more free formed prongs, the process comprising the steps of:
    (a) providing a molten thermally sensitive material;
    (b) providing a substrate having one or more protrusions;
    (c) depositing discrete amounts of said molten thermally sensitive material on one or more of said protrusions on (of) said substrate;
    (d) stretching a portion of said discrete amounts of said molten thermally sensitive material in a direction having a vector component parallel to the plane of said substrate so as to form a prong on each said protrusion having said molten thermally sensitive material deposited thereon; and
    (e) solidifying said molten thermally sensitive material of said prong, said prong having a base, a shank, and an engaging means.

2. The process according to claim 1 wherein said step of depositing discrete amounts of said molten thermally sensitive material on said protrusions comprises:
    (a) providing a first roll adapted to rotate about its centerline, which centerline is disposed generally parallel to the plane of said substrate;
    (b) providing a smooth applicator surface on said first roll;
    (c) disposing said molten thermally sensitive material on the smooth surface of said first roll; and
    (d) rotating said first roll until said smooth surface containing said molten thermally sensitive material contacts said protrusions of said substrate.

3. The process according to claim 2 further comprising:
    (a) providing a doctor blade in juxtapositional relationship with the periphery of said first roll; and
    (b) scraping excess material from said first roll with said doctor blade as said first roll is rotated.

4. The process according to claim 3 further comprising:
    (a) providing a backing roll having a centerline disposed generally parallel to said centerline of said first roll;
    b) juxtaposing said first roll and said backing roll to form a nip therebetween; and
    (c) rotating said first roll and said backing roll at a substantially equal surface velocity at said nip, wherein said substrate is transported through said nip in a first direction.

5. The process according to claim 4 wherein said substrate is transported at a substantially uniform velocity.

6. The process according to claim 1 wherein said step of stretching said discrete amounts of molten thermally sensitive material forms a prong and a moil and wherein the process additionally comprises the step of severing said moil from said prong, and wherein said step of severing said moil comprises:
(a) disposing a generally stationary means for severing said moil substantially across said substrate; and
(b) intercepting said moil with said stationary means.

7. The process according to claim 6 further comprising heating said means for severing said material.

8. The process according to claim 7 wherein said severing means is heated to a temperature of at least the melting point of said stretched material.

9. The process according to claim 4 further comprising directing an air current toward said discrete amounts of said molten thermally sensitive material in a second direction, said second direction being within about ±90° of said first direction.

10. The process according to claim 1 further comprising establishing a temperature differential across said deposition of material.

11. A process comprising the steps of:
(a) providing a thermally sensitive material;
(b) heating said thermally sensitive material to at least the melting point to provide a molten thermally sensitive material;
(c) providing a substrate;
(d) transporting said substrate in a first direction;
(e) embossing said substrate to form one or more protrusions;
(f) depositing discrete amounts of said molten thermally sensitive material on one or more of said protrusions on said substrate;
(g) stretching a portion of said discrete amounts of said molten thermally sensitive material in a direction having a vector component parallel to the plane of said substrate so as to form a prong and a moil;
(h) severing said moil from said stretched molten thermally sensitive to leave said prong; and
(i) solidifying said molten thermally sensitive material of said prong, said prong having a base, a shank and an engaging means.

12. The process according to claim 11 wherein said step of embossing said substrate comprises:
(a) providing a rubber impression roll adapted to rotate about its centerline, which centerline is disposed generally parallel to the plane of said substrate and generally perpendicular to the first direction of transport;
(b) providing a pattern roll adapted to rotate about its centerline, which centerline is disposed generally parallel to the plane of said substrate and generally perpendicular to the first direction of transport and wherein said pattern roll having raised knobs thereon;
(c) rotating said pattern roll and said impression roll;
(d) passing said substrate between said rubber impression roll and said pattern roll and;
(d) embossing said substrate by pressing said knobs of said pattern roll against said substrate and said rubber impression roll.

13. The process according to claim 11 wherein said step of depositing said material on substrate comprises:
(a) providing a first roll adapted to rotate about its centerline, which centerline is disposed generally parallel to the plane of substrate and generally perpendicular to the first direction of transport;
(b) providing a smooth applicator surface on said first roll;
(c) disposing said molten thermally sensitive material on the surface of said first roll; and
(d) rotating said first roll until said smooth surface containing said material contacts said protrusions said substrate.

14. The process according to claim 13 further comprising:
(a) providing a doctor blade in juxtapositional relationship with the periphery of said first roll; and
(b) scraping excess material from said first roll with said doctor blade as said first roll is rotated.

15. The process according to claim 11 wherein said step of severing said moil comprises:
(a) disposing a generally stationary means for severing said moil substantially across said substrate; and
(b) intercepting said moil with said means for severing as said prong and said moil are transported by substrate.

16. The process according to claim 15 further comprising heating said means for severing said moil.

17. The process according to claim 16 wherein said severing means is heated to a temperature of at least the melting point of said stretched material.

18. The process according to claim 11 further comprising directing an air current towards said depositions of material in a second direction, said second direction being within about ±90° of said first direction.

19. The process according to claim 11 further comprising establishing a temperature differential across said deposition of material.

* * * * *

UNITED STATES PATENT AND TRADEMARK OFFICE
CERTIFICATE OF CORRECTION

PATENT NO. : 5,385,706
DATED : January 31, 1995
INVENTOR(S) : Dennis A. Thomas

It is certified that error appears in the above-identified patent and that said Letters Patent is hereby corrected as shown below:

| | |
|---|---|
| Column 1, line 10 | delete "press" and insert --process--. |
| Column 1, line 15 | after "in" insert --the--. |
| Column 1, line 17 | delete "complement " and insert --complementary--. |
| Column 1, line 29 | delete "3,009,5" and insert --3,009,235--. |
| Column 4, line 55 | delete "N". |
| Column 8, line 31 | delete "a" and insert --$\alpha$--. |
| Column 11, line 68 | delete "an" and insert --art--. |
| Column 16, line 59 | delete "4" and insert --74--. |
| Column 21, line 5 | delete "pan" and insert --part--. |
| Column 21, line 7 | delete "pans" and insert --parts--. |
| Column 23, line 31 | delete "to", first occurrence. |
| Column 25, line 50 | delete "550" and insert --55--. |
| Column 26, line 13 | delete "at." and insert --al.--. |

UNITED STATES PATENT AND TRADEMARK OFFICE
CERTIFICATE OF CORRECTION

PATENT NO. : 5,385,706

DATED : January 31, 1995

INVENTOR(S) : Dennis A. Thomas

It is certified that error appears in the above-identified patent and that said Letters Patent is hereby corrected as shown below:

Column 28, line 60    delete "b)" and insert --(b)--.

Column 29, line 32    delete "(f" and insert --(f)--.

Column 30, line 10    delete "(d)" insert --(e)--.

Column 30, line 24    after "protrusions" insert --on--.

Column 30, line 37    after "by" insert --said--.

Signed and Sealed this

Sixteenth Day of March, 1999

Attest:

Q. TODD DICKINSON

*Attesting Officer*     *Acting Commissioner of Patents and Trademarks*